(12) United States Patent
Murata et al.

(10) Patent No.: US 11,295,776 B2
(45) Date of Patent: *Apr. 5, 2022

(54) MAGNETIC TAPE HAVING CONTROLLED DIMENSIONS, MAGNETIC TAPE CARTRIDGE, AND MAGNETIC TAPE APPARATUS

(71) Applicant: FUJIFILM Corporation, Tokyo (JP)

(72) Inventors: Yuto Murata, Minami-ashigara (JP); Yusuke Kaneko, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,977

(22) Filed: Jan. 28, 2021

(65) Prior Publication Data

US 2021/0241787 A1    Aug. 5, 2021

(30) Foreign Application Priority Data

Jan. 31, 2020    (JP) .............................. JP2020-015565

(51) Int. Cl.
*G11B 5/735*    (2006.01)
*G11B 5/706*    (2006.01)
(Continued)

(52) U.S. Cl.
CPC ........ *G11B 5/7356* (2019.05); *G11B 5/70615* (2013.01); *G11B 5/712* (2013.01);
(Continued)

(58) Field of Classification Search
None
See application file for complete search history.

(56) References Cited

U.S. PATENT DOCUMENTS

| 10,720,181 B1 | 7/2020 | Yamaga et al. | |
| 2021/0201945 A1* | 7/2021 | Kasada | G11B 5/5928 |
| 2021/0241795 A1* | 8/2021 | Murata | G11B 5/73931 |

FOREIGN PATENT DOCUMENTS

JP    6590102 B1    10/2019

OTHER PUBLICATIONS

Notice of Allowance dated Jul. 21, 2021 in U.S. Appl. No. 17/161,031.
(Continued)

*Primary Examiner* — Kevin M Bernatz
(74) *Attorney, Agent, or Firm* — Sughrue Mion, PLLC

(57) ABSTRACT

The magnetic tape satisfies TDSage+TDSenv−TC≤0.30 μm. TDSage is a maximum absolute value of a difference between the servo band interval obtained before a predetermined storage and the servo band interval obtained after the storage, TDSenv is a value calculated by multiplying a difference between a maximum value and a minimum value of the servo band interval respectively obtained under five predetermined environments by ½, TC is a value calculated by multiplying TDStens by 0.5 N, and TDStens is a ratio of a change in the servo band interval to a change in tension calculated from the servo band interval respectively obtained under five predetermined environments by applying a plurality of different tensions in the longitudinal direction of the magnetic tape.

20 Claims, 2 Drawing Sheets

(51) Int. Cl.
  *G11B 20/12* (2006.01)
  *G11B 5/712* (2006.01)
  *G11B 5/73* (2006.01)
  *G11B 15/43* (2006.01)

(52) U.S. Cl.
  CPC ...... *G11B 5/73929* (2019.05); *G11B 5/73931* (2019.05); *G11B 15/43* (2013.01); *G11B 20/1201* (2013.01); *G11B 5/70678* (2013.01); *G11B 2020/1281* (2013.01)

(56)    References Cited

OTHER PUBLICATIONS

Office Action dated May 11, 2021 in U.S. Appl. No. 17/161,031.
Notice of Allowance dated Nov. 12, 2021 in U.S. Appl. No. 17/161,031.

* cited by examiner

MT

MAGNETIC TAPE HAVING CONTROLLED DIMENSIONS, MAGNETIC TAPE CARTRIDGE, AND MAGNETIC TAPE APPARATUS

CROSS-REFERENCE TO RELATED APPLICATIONS

This application claims priority under 35 U.S.C. 119 to Japanese Patent Application No. 2020-015565 filed on Jan. 31, 2020. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

There are tape-shaped and disk-shaped magnetic recording medium, and the tape-shaped magnetic recording medium, that is, a magnetic tape is mainly used for data storage applications such as data backup and archive (for example, refer to JP6590102B).

SUMMARY OF THE INVENTION

Recording of data on a magnetic tape is usually performed by running the magnetic tape in a magnetic tape apparatus (usually called "drive") and recording the data on a data band by making a magnetic head follow the data band of the magnetic tape. As a result, a data track is formed in the data band. In addition, in a case where recorded data are reproduced, the data recorded on the data band is read by running the magnetic tape in the magnetic tape apparatus and by making the magnetic head follow the data band of the magnetic tape.

In order to increase the accuracy with which the magnetic head following the data band of the magnetic tape in the recording and/or reproduction as described above, a system (hereinafter, it is described as a "servo system".) for performing head tracking using a servo signal has been put into practical use.

Further, dimension information in the width direction of the running magnetic tape is acquired using the servo signal, and a tension applied in the longitudinal direction of the magnetic tape is adjusted according to the acquired dimension information, thereby controlling the dimension in the width direction of the magnetic tape (refer to, for example, paragraph [0171] in JP6590102B). In a case where the magnetic head for recording or reproducing data is shifted from a target track position and data is recorded or reproduced by the width deformation of the magnetic tape during recording or reproducing, a phenomenon such as overwriting of recorded data, defective reproduction, or the like occurs. The present inventors believe that the above-described tension adjustment is an effective means for suppressing the occurrence of such a phenomenon.

In view of the above, an object according to one aspect of the present invention is to provide the magnetic tape in which recording and/or reproduction can be performed satisfactorily by controlling the dimension in the width direction of the magnetic tape by adjusting the tension applied in the longitudinal direction of the magnetic tape.

One aspect of the present invention relates to a magnetic tape comprising:
a non-magnetic support; and
a magnetic layer containing a ferromagnetic powder,
in which the magnetic layer has a plurality of servo bands,
the following Expression 1 is satisfied;

$$TDSage + TDSenv - TC \leq 0.30 \text{ μm}, \qquad \text{(Expression 1)}$$

in Expression 1, TDSage is a maximum absolute value of a difference between a servo band interval obtained before storage for 24 hours in an environment with a temperature of 60° C. and a relative humidity of 20% and a servo band interval obtained after the storage,
where a unit of TDSage is μm,
TDSenv is a value calculated by multiplying a difference between a maximum value and a minimum value by ½ in servo band intervals obtained respectively in the following five environments;
a temperature of 16° C. and a relative humidity of 20%,
a temperature of 16° C. and a relative humidity of 80%,
a temperature of 26° C. and a relative humidity of 80%,
a temperature of 32° C. and a relative humidity of 20%, and
a temperature of 32° C. and a relative humidity of 55%,
where a unit of TDSenv is μm,
TC is a value calculated by multiplying TDStens by 0.5 N, and
TDStens is a ratio of a change in a servo band interval to a change in tension, which is calculated from servo band intervals obtained by applying a plurality of different tensions in a longitudinal direction of the magnetic tape and obtained respectively in the following five environments;
a temperature 16° C. and a relative humidity 20%,
a temperature 16° C. and a relative humidity 80%,
a temperature 26° C. and a relative humidity 80%,
a temperature 32° C. and a relative humidity 20%, and
a temperature 32° C. and a relative humidity 55%
where a unit of TDStens is μm/N.

In one aspect, the magnetic tape can satisfy the following Expression 1-1.

$$TDSage + TDSenv - TC \leq 0.05 \text{ μm} \qquad \text{(Expression 1-1)}$$

In one aspect, the magnetic tape may have a thickness of equal to or less than 5.6 μm.

In one aspect, the magnetic tape may have a thickness of equal to or less than 5.3 μm.

In one aspect, the magnetic tape may have a non-magnetic layer containing a non-magnetic powder, which is provided between the non-magnetic support and the magnetic layer.

In one aspect, the magnetic tape may have a back coating layer containing a non-magnetic powder on a surface side of the non-magnetic support opposite to a surface side having the magnetic layer.

In one aspect, the non-magnetic support may be an aromatic polyester support.

In one aspect, the aromatic polyester support may be a polyethylene terephthalate support.

In one aspect, the aromatic polyester support may be a polyethylene naphthalate support.

One aspect of the present invention relates to a magnetic tape cartridge comprising the magnetic tape.

One aspect of the present invention relates to a magnetic tape apparatus comprising the magnetic tape cartridge.

In one aspect, in a case where the magnetic tape runs in the magnetic tape apparatus, a tension applied in the longitudinal direction of the magnetic tape may be variably adjusted.

In one aspect, the tension may be adjusted in a range of 0.2 N to 1.2 N.

In one aspect, the magnetic tape apparatus further comprises a magnetic head having a reproducing element having a reproducing element width of equal to or less than 0.8 μm.

According to one aspect of the present invention, the magnetic tape in which recording and/or reproduction can be performed satisfactorily by controlling the dimension in the width direction of the magnetic tape by adjusting the tension applied in the longitudinal direction of the magnetic tape can be provided. In addition, according to one aspect of the present invention, it is possible to provide the magnetic tape cartridge including the magnetic tape, and the magnetic tape apparatus including the magnetic tape cartridge.

DESCRIPTION OF THE PREFERRED EMBODIMENTS

Magnetic Tape

Figure 1:
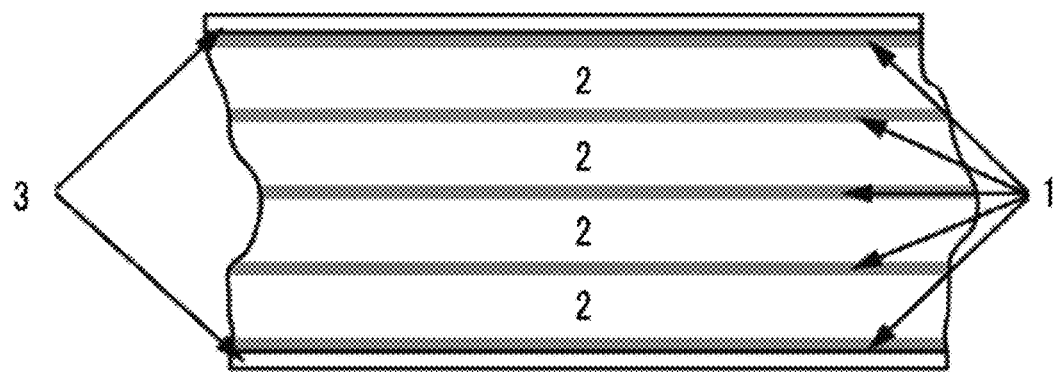
FIG. 1 shows a disposition example of a data band and a servo band.

One aspect of the present invention relates to a magnetic tape having a non-magnetic support and a magnetic layer containing a ferromagnetic powder, the magnetic layer having a plurality of servo bands, and satisfying the above Expression 1.

In a magnetic tape apparatus which controls a dimension in the width direction of the magnetic tape by adjusting the tension applied in the longitudinal direction of the magnetic tape, the larger the tension is applied in the longitudinal direction of the magnetic tape, the larger the dimension in the width direction of the magnetic tape can be shrunk (that is, the width can be made narrower), and the smaller the tension is, the smaller the degree of the shrunk. By adjusting the tension applied in the longitudinal direction of the magnetic tape in this manner, the dimension in the width direction of the magnetic tape can be controlled.

The present inventors have paid attention to the fact that a tape dimensional stability of the magnetic tape in a state in which the tension is applied in the longitudinal direction of the tape can be changed depending on a difference in the measurement environment, in the course of repeated studies to obtain the magnetic tape in which recording and/or reproduction can be performed satisfactorily by adjusting the tension applied in the longitudinal direction of the magnetic tape and controlling the dimension in the width direction of the magnetic tape. As a result of further intensive investigation, the dimensional stability of the magnetic tape in a state in which the tension is applied in the longitudinal direction of the tape, which is measured under various environments in which the magnetic tape can be placed in use and/or storage, has been determined as an index. This index is the above described TDSage and TDSenv. "TDS" is intended as an abbreviation for "tape dimensional stability" and "age" is intended as an abbreviation for long-term storage. In addition, "env" is intended as an abbreviation for "environment". Further, with respect to TDStens described later, "tens" is intended to be an abbreviation for "tension". The present inventors consider that "TDSage" in Expression 1 is a value obtained by the method described later and can be an index of the amount of change in a servo band interval due to long-term storage. In addition, the present inventors consider that "TDSenv" is a value obtained by the method described later and can be an index of the amount of change in a servo band interval due to the usage environment. Further, "TC" is a value obtained from TDStens, as will be described later. The present inventors believe that "TC" can be an index of the amount of track position deviation allowed in a case of recording and/or reproduction while adjusting the tension. As a result of intensive examination, the present inventors have newly found that a magnetic tape in which "TDSage", "TDSenv", and "TC" satisfy Expression 1 is suitable as a magnetic tape for recording and/or reproduction in a magnetic tape apparatus which controls a dimension in the width direction of the magnetic tape by adjusting the tension applied to the longitudinal direction of the magnetic tape. For example, the present inventors have newly found that a magnetic tape satisfying the above Expression 1 can contribute to enabling good recording and/or reproduction by controlling the dimension in the width direction of the magnetic tape by adjusting the tension applied to the longitudinal direction of the magnetic tape after long-term storage.

Hereinafter, the magnetic tape will be described later in detail. In the following, a region sandwiched between two servo bands adjacent to each other will be referred to as a data band.

Method of Measuring TDSage

The TDSage is obtained by the following method.

A magnetic tape cartridge accommodating a magnetic tape to be measured is placed in an environment having an ambient temperature of 23° C. and a relative humidity of 50% for 5 days in order to adapt to the magnetic tape in the measurement environment.

Thereafter, in the magnetic tape apparatus having a tension adjusting mechanism for applying the tension in the longitudinal direction of the magnetic tape under the measurement environment, the magnetic tape is made to run in a state of applying a tension of 0.7 N in the longitudinal direction of the magnetic tape. For such running, over the entire length of the magnetic tape, the interval between two servo bands adjacent to each other across the data band is measured at 1 m interval. In the measurement for obtaining the TDSage, TDSenv, and TC described in the present invention and the present specification, the value of the tension applied in the longitudinal direction of the magnetic tape is a set value set in the magnetic tape apparatus. In addition, in the present invention and the present specification, the "measurement at 1 m interval" refers to a measurement target region having a length L meter (m), in which in a case where a position of one terminal of the measurement target region is set to 0 m, positions in the direction toward the other terminal are set to 1 m, 2 m, 3 m . . . , and a position of the other terminal is denoted by Lm, a first measurement position is 1 m, and a last measurement position is one position before the position of Lm. Further, in a case where there are a plurality of servo band intervals, the servo band intervals are measured in the same manner for all servo band intervals. The servo band interval measured in this way is defined as the "servo band interval before storage" at each measurement position.

Then, the magnetic tape cartridge is stored for 24 hours in a storage environment having an ambient temperature of 60°

C. and a relative humidity of 20%. The inventors believe that this storage may correspond to long-term storage for about 10 years in an environment of an ambient temperature of 32° C. and a relative humidity of 55%.

After such storage, the magnetic tape cartridge is placed in a measurement environment having an ambient temperature of 23° C. and a relative humidity of 50% for 5 days. Thereafter, in the magnetic tape apparatus having a tension adjusting mechanism for applying the tension in the longitudinal direction of the magnetic tape under the same measurement environment, the magnetic tape is made to run in a state of applying a tension of 0.7 N in the longitudinal direction of the magnetic tape. For such running, the servo band interval is measured in the same manner as in the method described above. The servo band interval measured in this way is defined as the "servo band interval after storage" at each measurement position.

For all servo band intervals, a difference between the servo band interval before storage and the servo band interval after storage measured at 1 m interval is obtained. In this way, a plurality of difference values are obtained. The maximum absolute value of the obtained difference is defined as the "TDSage" of the magnetic tape to be measured.

The interval between two servo bands adjacent to each other across the data band can be obtained, for example, by using a position error signal (PES) obtained from a servo signal obtained by reading a servo pattern with a servo signal reading element. With respect to details, the description of the Examples below can be referred to.

Method of Measuring TDSenv

The TDSenv is obtained by the following method.

For each measurement environment, the magnetic tape cartridge accommodating the magnetic tape to be measured is placed in the measurement environment for 5 days in order to adapt to the measurement environment. The measurement environments are the five environments described above (that is, a temperature of 16° C. and relative humidity of 20%, a temperature of 16° C. and relative humidity of 80%, a temperature of 26° C. and relative humidity of 80%, a temperature of 32° C. and relative humidity of 20%, and a temperature of 32° C. and relative humidity of 55%).

Thereafter, in the magnetic tape apparatus having a tension adjusting mechanism for applying the tension in the longitudinal direction of the magnetic tape under the measurement environment, the magnetic tape is made to run in a state of applying a tension of 0.7 N in the longitudinal direction of the magnetic tape. For the magnetic tape, a terminal on the side wound onto the reel of the magnetic tape cartridge is called the inner terminal, and a terminal on the opposite side is called the outer terminal. The outer terminal is 0 m, and the servo band interval is measured at 1 m interval in a data band 0 (zero) for the above running in a region (hereinafter, it is described as a "reel periphery 100 m region".) extending from 0 m to 100 m in length. The "data band 0" is a data band defined by the standard as a data band in which data is first embedded (recorded). The arithmetic average of the measured servo band intervals is taken as the servo band interval in the measurement environment.

After obtaining the servo band interval in each of the five environments as described above, a value calculated as "(maximum−minimum)×½" is defined as "TDSenv" of the magnetic tape to be measured by using the maximum value and the minimum value among the obtained values.

Method of Measuring TC

The TC is obtained by the following method.

For each measurement environment, the magnetic tape cartridge accommodating the magnetic tape to be measured is placed in the measurement environment for 5 days in order to adapt to the measurement environment. The measurement environments are the five environments described above (that is, a temperature of 16° C. and relative humidity of 20%, a temperature of 16° C. and relative humidity of 80%, a temperature of 26° C. and relative humidity of 80%, a temperature of 32° C. and relative humidity of 20%, and a temperature of 32° C. and relative humidity of 55%).

Then, under the measurement environment, the following measurement is performed in the magnetic tape apparatus having the tension adjusting mechanism for applying the tension in the longitudinal direction of the magnetic tape under the measurement environment.

The magnetic tape is made to run in a state of applying a tension of 0.2 N in the longitudinal direction of the magnetic tape. For such running, the servo band interval is measured in data band 0 (zero) at 1 m intervals in the reel periphery 100 m region. The arithmetic average of the measured servo band intervals is defined as "$G_{0.2\ N}$".

After measuring $G_{0.2\ N}$, the tension applied in the longitudinal direction of the magnetic tape is increased to 0.4 N, the servo band interval is measured in the same manner as described above in a state of applying a tension of 0.4 N, and the arithmetic average of the measured servo band intervals is defined as "$G_{0.4N}$".

After measuring $G_{0.4\ N}$, the tension applied in the longitudinal direction of the magnetic tape is increased to 0.6 N, the servo band interval is measured in the same manner as described above in a state of applying a tension of 0.6 N, and the arithmetic average of the measured servo band intervals is defined as "$G_{0.6\ N}$".

After measuring $G_{0.6\ N}$, the tension applied in the longitudinal direction of the magnetic tape is increased to 0.8 N, the servo band interval is measured in the same manner as described above in a state of applying a tension of 0.8 N, and the measured servo band intervals is defined as "$G_{0.8\ N}$".

After measuring $G_{0.8\ N}$, the tension applied in the longitudinal direction of the magnetic tape is increased to 1.0 N, the servo band interval is measured in the same manner as described above in a state of applying a tension of 1.0 N, and the arithmetic average of the measured servo band intervals is defined as "$G_{1.0\ N}$".

After measuring $G_{1.0\ N}$, the tension applied in the longitudinal direction of the magnetic tape is increased to 1.2 N, the servo band interval is measured in the same manner as described above in a state of applying a tension of 1.2 N, and the arithmetic average of the measured servo band intervals is defined as "$G_{1.2\ N}$".

The measurement of $G_{0.2\ N}$, $G_{0.4\ N}$, $G_{0.6\ N}$, $G_{0.8\ N}$, $G_{1.0\ N}$, and $G_{1.2\ N}$ is performed within 5 minutes, respectively, and the measurement at each tension is started within 5 minutes after the measurement at the previous tension is ended.

With respect to the $G_{0.2\ N}$, $G_{0.4\ N}$, $G_{0.6\ N}$, $G_{0.8\ N}$, $G_{1.0\ N}$, and $G_{1.2\ N}$ obtained by the above method, the ratio of the change in the servo band interval to the change in tension is obtained. More specifically, the absolute value of a slope A obtained by the least-squares method using the servo band interval obtained with tension applied as X and each tension applied as Y of the linear function Y=AX+B (A is a slope, B is an intercept) (that is, the above arithmetic average obtained by each measurement) is defined as the "TDStens" which is the ratio of the change in the servo band interval to the change in tension in the measurement environment.

The above measurement is performed in the above five environments. Thus, the "TDStens" which is the ratio of the change in the servo band interval to the change in tension in the five environments is obtained. A minimum value of TDStens obtained in each of the five environments is adopted as a value of "TDStens" for obtaining the TC of the magnetic tape to be measured, and a value obtained by multiplying the value of TDStens (unit: μm/N) by 0.5 N, that is, a value calculated as "TDStens×0.5" is defined as the "TC" of the magnetic tape to be measured.

Expression 1
Expression 1 is as follows.

$$TDSage+TDSenv-TC \leq 0.30 \, \mu m \quad \text{(Expression 1)}$$

Methods of measuring "TDSage", "TDSenv" and "TC" for obtaining the Expression 1 are as described above. In a case of obtaining these three values for the magnetic tape to be measured, the "TDSage" is first measured. After that, in a case of measuring "TDSenv" and "TC", the measurement order is not particularly limited, and either of them may be measured first.

The magnetic tape satisfies Expression 1. As a result of intensive examination, the present inventors have newly found that a magnetic tape satisfying Expression 1 is suitable as a magnetic tape for recording and/or reproducing in a magnetic tape apparatus which controls the dimension in the width direction of the magnetic tape by adjusting the tension applied in the longitudinal direction of the magnetic tape. More specifically, the magnetic tape can contribute to enabling good recording and/or reproduction by controlling the dimension in the width direction of the magnetic tape by adjusting the tension applied to the longitudinal direction of the magnetic tape after long-term storage. From this point of view, the left side value of Expression 1 is equal to or less than 0.30 μm, preferably equal to or less than 0.25 μm, more preferably equal to or less than 0.20 μm, more preferably equal to or less than 0.15 μm, still more preferably equal to or less than 0.10 μm, even more preferably equal to or less than 0.05 μm, and further more preferably equal to or less than 0.00 μm. In one aspect, the magnetic tape can satisfy the Expression 1-1 described above. In addition, the left side of Expression 1 is preferably equal to or more than −1.00 μm, more preferably equal to or more than −0.90 μm, still more preferably equal to or more than −0.80 μm, still more preferably equal to or more than −0.70 μm, and even more preferably equal to or more than −0.60 μm from the viewpoint of process suitability in manufacturing a magnetic tape.

With respect to Expression 1, the value of the left side of Expression 1 can be adjusted, for example, according to the thickness of the magnetic tape, the strength (for example, Young's modulus) of the non-magnetic support, the moisture content of the non-magnetic support, the manufacturing conditions of the magnetic tape, and the like. Regarding this point, the description below can be referred to.

The magnetic tape may satisfy Expression 1, and the values of TDSage, TDSenv, and TC are not particularly limited.

In one aspect, the TDSage can be equal to or more than 0.00 μm, more than 0.00 μm, equal to or more than 0.05 μm, equal to or more than 0.10 μm, or equal to or more than 0.30 μm, and can be equal to or less than 3.00 μm, equal to or less than 2.50 μm, equal to or less than 2.00 μm, or equal to or less than 1.50 μm. The TDSage can be adjusted, for example, according to the manufacturing conditions of the magnetic tape.

In one aspect, TDSenv may be equal to or more than 0.00 μm, more than 0.00 μm, equal to or more than 0.05 μm, or equal to or more than 0.10 μm, and equal to or less than 2.00 μm, equal to or less than 1.50 μm, or equal to or less than 1.00 μm. TDSenv can be adjusted by, for example, the strength of the non-magnetic support (for example, Young's modulus), the moisture content of the non-magnetic support, and the like.

In one aspect, the TC can be equal to or more than 0.00 μm, more than 0.00 μm, equal to or more than 0.10 μm, equal to or more than 0.30 μm, or equal to or more than 0.50 μm, and can be equal to or less than 3.00 μm, equal to or less than 2.50 μm, equal to or less than 2.00 μm, or equal to or less than 1.50 μm. Further, in one aspect, the TDStens can be equal to or more than 0.00 μm/N, more than 0.00 μm/N, equal to or more than 0.20 μm/N, equal to or more than 0.60 μm/N, or equal to or more than 1.00 μm/N, and can be equal to or less than 6.00 μm/N, equal to or less than 5.00 μm/N, equal to or less than 4.00 μm, or equal to or less than 3.00 μm. TC and TDStens can be adjusted by, for example, the thickness of the magnetic tape.

Non-Magnetic Support

As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, and polyethylene naphthalate are preferable.

The non-magnetic support of the magnetic tape may, in one aspect, be an aromatic polyester support. In the present invention and the present specification, an "aromatic polyester" means a resin including an aromatic skeleton and a plurality of ester bonds, and the "aromatic polyester support" means a support including at least one layer of an aromatic polyester film. The "aromatic polyester film" is defined as a film in which the component that occupies the most on a mass basis among the components constituting this film is the aromatic polyester. The "aromatic polyester support" in the present invention and the present specification includes those in which the resin films contained in the support are all aromatic polyester films, and those in which the resin films include aromatic polyester films and other resin films. Specific aspects of the aromatic polyester support include a single layer aromatic polyester film, a laminated film of aromatic polyester films with two or more layers having the same constituent component, a laminated film of aromatic polyester films with two or more layers having different constituent components, a laminated film including aromatic polyester films with one or more layers and resin films other than aromatic polyesters with one or more layers, and the like. An adhesive layer or the like may be randomly included between two adjacent layers in the laminated film. In addition, the aromatic polyester support may randomly include a metal film and/or a metal oxide film formed on one or both surfaces by vapor deposition or the like. The same applies to the "polyethylene terephthalate support" and the "polyethylene naphthalate support" in the present invention and the present specification.

An aromatic ring contained in the aromatic skeleton of the aromatic polyester is not particularly limited. Specific examples of the aromatic ring include a benzene ring and a naphthalene ring.

For example, polyethylene terephthalate (PET) is a polyester containing a benzene ring and is a resin obtained by polycondensation of ethylene glycol and terephthalic acid and/or dimethyl terephthalate. The "polyethylene terephthalate" in the present invention and the present specification includes structures having one or more other components (for example, copolymerizing components, components introduced at a terminal or a side chain, and the like) in addition to the above components.

The polyethylene naphthalate (PEN) is a polyester containing the naphthalene ring, and is a resin obtained by carrying out an esterification reaction of dimethyl 2,6-naphthalenedicarboxylate with ethylene glycol, and then carrying out a transesterification reaction and a polycondensation reaction. The "polyethylene naphthalate" in the present invention and the present specification includes structures having one or more other components (for example, copolymerizing components, components introduced at a terminal or a side chain, and the like) in addition to the above components.

In addition, the non-magnetic support can be a biaxial stretching film, and may be a film that has been subjected to corona discharge, plasma treatment, easy adhesion treatment, heat treatment, or the like.

An index of physical properties of the non-magnetic support includes, for example, a moisture content. In the present invention and the present specification, the moisture content of the non-magnetic support is a value obtained by the following method. The moisture content shown in the table below is a value obtained by the following method.

A sample piece (for example, a sample piece with a mass of several grams) cut out from the non-magnetic support to be measured for the moisture content is dried to constant mass in a vacuum dryer having a temperature of 180° C. and a pressure of equal to or less than 100 Pa (Pascal). The mass of the sample piece dried in this way is denoted by W1. W1 is a value measured in a measurement environment of a temperature of 23° C. and a relative humidity of 50% within 30 seconds after being taken out from the vacuum dryer. Next, the mass after placing this sample piece in an environment of a temperature of 25° C. and a relative humidity of 75% for 48 hours is denoted by W2. W2 is a value measured in a measurement environment of a temperature of 23° C. and a relative humidity of 50% within 30 seconds after being taken out from the environment. The moisture content is calculated by the following Expression.

Moisture content (%)=[(W2−W1)/W1]×100

For example, the moisture content of the non-magnetic support can be obtained by the above-described method after removing a part of the magnetic tape other than the non-magnetic support such as a magnetic layer by a known method (for example, film removal using organic solvent).

In one aspect, the moisture content of the non-magnetic support of the magnetic tape is preferably equal to or less than 1.0%, more preferably equal to or less than 0.8%, and still more preferably equal to or less than 0.6. In addition, the moisture content of the non-magnetic support of the magnetic tape may be 0%, equal to or more than 0%, more than 0%, or equal to or more than 0.1%. By using a non-magnetic support having a low moisture content, the value of TDSenv tends to be small.

An index of physical properties of the non-magnetic support includes, for example, a Young's modulus. In the present invention and the present specification, the Young's modulus of the non-magnetic support is a value measured by the following method in a measurement environment of a temperature of 23° C. and a relative humidity of 50%. The Young's modulus shown in the table below is a value obtained by the following method using Tensilon manufactured by Baldwin Corporation as a universal tensile testing apparatus.

The sample piece cut out from the non-magnetic support to be measured is pulled by the universal tensile testing apparatus under the conditions of a chuck-to-chuck distance of 100 mm, a tensile speed of 10 mm/min, and a chart speed of 500 mm/min. As the universal tensile testing apparatus, for example, a commercially available universal tensile testing apparatus such as Tensilon manufactured by Baldwin Corporation, or a universal tensile testing apparatus having a known configuration can be used. From a tangent line of a rising portion of a load-elongation curve obtained in this way, the Young's modulus in the longitudinal direction and the width direction of the sample piece is calculated. Here, the longitudinal direction and the width direction of the sample piece mean the longitudinal direction and the width direction in a case where the sample piece is included in the magnetic tape.

For example, the Young's modulus in the longitudinal direction and the width direction of the non-magnetic support can be obtained by the above-described method after removing a part of the magnetic tape other than the non-magnetic support such as a magnetic layer by a known method (for example, film removal using organic solvent).

In one aspect, the Young's modulus of the non-magnetic support of the magnetic tape in the longitudinal direction is preferably equal to or more than 3000 MPa, more preferably equal to or more than 4000 MPa, and still more preferably equal to or more than 5000 MPa. In addition, the Young's modulus of the non-magnetic support of the magnetic tape in the longitudinal direction may be equal to or less than 15000 MPa, equal to or less than 13000 MPa, equal to or less than 11000 MPa, or equal to or less than 9000 MPa. In the width direction, the Young's modulus of the non-magnetic support of the magnetic tape in the width direction is preferably equal to or more than 2000 MPa, more preferably equal to or more than 3000 MPa, and still more preferably equal to or more than 4000 MPa. In addition, the Young's modulus of the non-magnetic support of the magnetic tape in the width direction may be equal to or less than 10000 MPa, equal to or less than 8000 MPa, or equal to or less than 6000 MPa. In a case where manufacturing the magnetic tape, the non-magnetic support is usually used with a machine direction (MD) of the film as the longitudinal direction and a transverse direction (TD) as the width direction. Further, in one aspect, the Young's modulus in the longitudinal direction is preferably larger than the Young's modulus in the width direction, and a difference (the Young's modulus in the longitudinal direction—the Young's modulus in the width direction) is more preferably in the range of 800 MPa to 3000 MPa.

The moisture content and Young's modulus of the non-magnetic support can be controlled by the type and mixing ratio of the components constituting the support, the manufacturing conditions of the support, and the like. For example, the Young's modulus in the longitudinal direction and the Young's modulus in the width direction can be controlled respectively by adjusting a stretching ratio in each direction in a biaxial stretching treatment.

Magnetic Layer

Ferromagnetic Powder

As the ferromagnetic powder contained in the magnetic layer, one or a combination of two or more kinds of ferromagnetic powder known as the ferromagnetic powder used in the magnetic layer of various magnetic recording medium can be used. It is preferable to use ferromagnetic powder having a small average particle size, from a viewpoint of improvement of recording density. In this respect, an average particle size of the ferromagnetic powder is preferably equal to or less than 50 nm, more preferably equal to or less than 45 nm, still more preferably equal to or less than 40 nm, still more preferably equal to or less than 35 nm, still more preferably equal to or less than 30 nm, still more preferably equal to or less than 25 nm, and still more preferably equal to or less than 20 nm. On the other hand, from a viewpoint of magnetization stability, an average particle size of the ferromagnetic powder is preferably equal to or more than 5 nm, more preferably equal to or more than 8 nm, still more preferably equal to or more than 10 nm, and still more preferably equal to or more than 15 nm, and still more preferably equal to or more than 20 nm.

Hexagonal Ferrite Powder

Preferred specific examples of the ferromagnetic powder may include a hexagonal ferrite powder. For details of the hexagonal ferrite powder, descriptions disclosed in paragraphs [0012] to [0030] of JP2011-225417A, paragraphs [0134] to [0136] of JP2011-216149A, paragraphs [0013] to [0030] of JP2012-204726A, and paragraphs [0029] to [0084] of JP2015-127985A can be referred to, for example.

In the present invention and the present specification, the "hexagonal ferrite powder" refers to the ferromagnetic powder in which a hexagonal ferrite type crystal structure is detected as a main phase by an X-ray diffraction analysis. The main phase refers to a structure to which the highest intensity diffraction peak in an X-ray diffraction spectrum obtained by the X-ray diffraction analysis is attributed. For example, in a case where the highest intensity diffraction peak is attributed to the hexagonal ferrite type crystal structure in an X-ray diffraction spectrum obtained by X-ray diffraction analysis, it is determined that the hexagonal ferrite type crystal structure is detected as the main phase. In a case where only a single structure is detected by the X-ray diffraction analysis, this detected structure is taken as the main phase. The hexagonal ferrite type crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and the present specification, the hexagonal strontium ferrite powder means that a main divalent metal atom contained in the powder is a strontium atom, and hexagonal barium ferrite powder means that a main divalent metal atom included in the powder is a barium atom. The main divalent metal atom refers to a divalent metal atom that occupies the most on an at % basis among divalent metal atoms included in the powder. Here, a rare earth atom is not included in the above divalent metal atom. The "rare earth atom" in the present invention and the present specification is selected from the group consisting of a scandium atom (Sc), a yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), a ytterbium atom (Yb), and a lutetium atom (Lu).

Hereinafter, the hexagonal strontium ferrite powder which is one aspect of the hexagonal ferrite powder will be described in more detail.

An activation volume of the hexagonal strontium ferrite powder is preferably in a range of 800 to 1600 nm$^3$. The fine particulate hexagonal strontium ferrite powder exhibiting an activation volume in the above range is suitable for producing a magnetic tape exhibiting excellent electromagnetic conversion characteristics. An activation volume of the hexagonal strontium ferrite powder is preferably equal to or more than 800 nm$^3$, and may be, for example, equal to or more than 850 nm$^3$. Further, from a viewpoint of further improving electromagnetic conversion characteristics, an activation volume of the hexagonal strontium ferrite powder is more preferably equal to or less than 1500 nm$^3$, still more preferably equal to or less than 1400 nm$^3$, still more preferably equal to or less than 1300 nm$^3$, still more preferably equal to or less than 1200 nm$^3$, and still more preferably equal to or less than 1100 nm$^3$. The same applies to an activation volume of the hexagonal barium ferrite powder.

The "activation volume" is a unit of magnetization reversal and is an index indicating a magnetic size of a particle. An activation volume described in the present invention and the present specification and an anisotropy constant Ku which will be described later are values obtained from the following relational expression between a coercivity Hc and an activation volume V, by performing measurement in a Hc measurement portion at a magnetic field sweep rate of 3 minutes and 30 minutes using a vibrating sample magnetometer (measurement temperature: 23° C.±1° C.). It should be noted that in a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the Expression, Ku: anisotropy constant (unit: J/m$^3$), Ms: saturation magnetization (unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, improving thermal stability can include the anisotropy constant Ku. The hexagonal strontium ferrite powder may preferably have Ku of equal to or more than 1.8×10$^5$ J/m$^3$, and more preferably have a Ku of equal to or more than 2.0×10$^5$ J/m$^3$. In addition, Ku of the hexagonal strontium ferrite powder may be, for example, equal to or less than 2.5×10$^5$ J/m$^3$. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder containing rare earth atoms may have an uneven distribution property of a rare earth atom surface layer portion. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content >1.0.

A rare earth atom content in the hexagonal strontium ferrite powder which will be described later is the same meaning as the rare earth atom bulk content. On the other hand, partial dissolution using an acid dissolves a surface layer portion of a particle configuring the hexagonal strontium ferrite powder, and thus, a rare earth atom content in a solution obtained by partial dissolution is a rare earth atom content in a surface layer portion of a particle configuring the hexagonal strontium ferrite powder. A rare earth atom surface layer portion content satisfying a ratio of "rare earth atom surface layer portion content/rare earth atom bulk content >1.0" means that in a particle of the hexagonal strontium ferrite powder, rare earth atoms are unevenly distributed in a surface layer portion (that is, more than an inside). The surface layer portion in the present invention and the present specification means a partial region from a surface of a particle configuring the hexagonal strontium ferrite powder toward an inside.

In a case where the hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring the hexagonal strontium ferrite powder contribute to suppression of a decrease in a reproducing output in repeated reproduction. It is supposed that this is because the hexagonal strontium ferrite powder includes a rare earth atom with a bulk content in the above range, and rare earth atoms are unevenly distributed in a surface layer portion of a particle configuring the hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of the hexagonal strontium ferrite powder contributes to the stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to suppression of a surface of the magnetic layer from being scraped by being slid with respect to the magnetic head. That is, it is supposed that the hexagonal strontium ferrite powder having rare earth atom surface layer portion uneven distribution property can also contribute to an improvement of running durability of the magnetic tape. It is supposed that this may be because uneven distribution of rare earth atoms on a surface of a particle configuring the hexagonal strontium ferrite powder contributes to an improvement of interaction between the particle surface and an organic substance (for example, a binding agent and/or an additive) included in the magnetic layer, and, as a result, an intensity of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more kinds of rare earth atoms is obtained for the total of two or more kinds of rare earth atoms. This also applies to other components in the present invention and the present specification. That is, unless otherwise noted, a certain component may be used one or in the combination of two or more. A content amount or content in the case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, a neodymium atom, a samarium atom, and a yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be equal to or more than 1.5. A "surface layer portion content/bulk content" larger than 1.0 means that in a particle configuring the hexagonal strontium ferrite powder, rare earth atoms are unevenly distributed in the surface layer portion (that is, more than the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, equal to or less than 10.0, equal to or less than 9.0, equal to or less than 8.0, equal to or less than 7.0, equal to or less than 6.0, equal to or less than 5.0, or equal to or less than 4.0. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method disclosed in a paragraph [0032] of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10% to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 μm. Elemental analysis of the obtained filtrate is performed by an inductively coupled plasma (ICP) analyzer. In this way, the surface layer portion content of a rare earth atom with respect to 100 at % of an iron atom can be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproducing output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In one aspect, σs of the hexagonal strontium ferrite powder may be equal to or more than 45 A·m²/kg, and may be equal to or more than 47 A·m²/kg. On the other hand, from a viewpoint of noise reduction, σs is preferably equal to or less than 80 A·m²/kg and more preferably equal to or less than 60 A·m²/kg. σs can be measured using a known measuring apparatus, such as a vibrating sample magnetometer, capable of measuring magnetic characteristics. In the present invention and the present specification, unless otherwise noted, the mass magnetization σs is a value measured at a magnetic field intensity of 15 kOe. 1 [kOe]=$10^6/4\pi$[A/m].

Regarding the content (bulk content) of a constituent atom of the hexagonal strontium ferrite powder, the strontium atom content may be, for example, in a range of 2.0 to 15.0 at % with respect to 100 at % of an iron atom. In one aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder may be, for example, in a range of 0.05 to 5.0 at % with respect to 100 at % of an iron atom, respectively.

As a crystal structure of hexagonal ferrite, a magnetoplumbite type (also referred to as an "M-type"), a W-type, a Y-type, and a Z-type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) occupies for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably equal to or less than 10.0 at %, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and the present specification, "not include" for a certain atom means that a content measured by an ICP analyzer after total dissolution is 0 mass %. A detection limit of the ICP analyzer is usually equal to or less than 0.01 ppm (parts per million) on a mass basis. The "not included" is used as a meaning including that an atom is included in an amount less than the detection limit of the ICP analyzer. In one aspect, the hexagonal strontium ferrite powder may not include a bismuth atom (Bi).

Metal Powder

As a preferred specific example of the ferromagnetic powder, a ferromagnetic metal powder can also be used. For details of the ferromagnetic metal powder, descriptions disclosed in paragraphs [0137] to [0141] of JP2011-216149A and paragraphs [0009] to [0023] of JP2005-251351A can be referred to, for example.

ε-iron oxide powder

As a preferred specific example of the ferromagnetic powder, ε-iron oxide powder can also be used. In the present invention and the present specification, "ε-iron oxide powder" refers to ferromagnetic powder in which an ε-iron oxide type crystal structure is detected as a main phase by X-ray diffraction analysis. For example, in a case where the highest intensity diffraction peak is attributed to an ε-iron oxide type crystal structure in an X-ray diffraction spectrum obtained by X-ray diffraction analysis, it is determined that the ε-iron oxide type crystal structure is detected as the main phase. As a manufacturing method of ε-iron oxide powder, a producing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. S280 to S284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The fine particulate ε-iron oxide powder exhibiting an activation volume in the above range is suitable for manufacturing a magnetic tape exhibiting excellent electromagnetic conversion characteristics. An activation volume of the ε-iron oxide powder is preferably equal to or more than 300 $nm^3$, and may be, for example, equal to or more than 500 $nm^3$. Further, from a viewpoint of further improving electromagnetic conversion characteristics, an activation volume of the ε-iron oxide powder is more preferably equal to or less than 1400 $nm^3$, still more preferably equal to or less than 1300 $nm^3$, still more preferably equal to or less than 1200 $nm^3$, and still more preferably equal to or less than 1100 $nm^3$.

An index for reducing thermal fluctuation, in other words, improving thermal stability can include the anisotropy constant Ku. The ε-iron oxide powder preferably may have Ku of equal to or more than $3.0 \times 10^4$ $J/m^3$, and more preferably may have Ku of equal to or more than $8.0 \times 10^4$ $J/m^3$. Ku of the ε-iron oxide powder may be, for example, equal to or less than $3.0 \times 10^5$ $J/m^3$. Here, it means that the higher Ku is, the higher thermal stability is, this is preferable, and thus, a value thereof is not limited to the values exemplified above.

From a viewpoint of increasing the reproducing output in a case of reproducing data recorded on the magnetic tape, it is desirable that mass magnetization σs of the ferromagnetic powder included in the magnetic tape is high. In this regard, in one aspect, σs of the ε-iron oxide powder may be equal to or more than 8 $A \cdot m^2/kg$, and may be equal to or more than 12 $A \cdot m^2/kg$. On the other hand, from a viewpoint of noise reduction, σs of the ε-iron oxide powder is preferably equal to or less than 40 $A \cdot m^2/kg$ and more preferably equal to or less than 35 $A \cdot m^2/kg$.

In the present invention and the present specification, unless otherwise noted, an average particle size of various powders such as the ferromagnetic powder is a value measured by the following method using a transmission electron microscope.

The powder is imaged at a magnification ratio of 100,000 with a transmission electron microscope, and the image is printed on printing paper so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss Co., Ltd. The average particle size shown in Examples which will be described later is a value measured by using a transmission electron microscope H-9000 manufactured by Hitachi, Ltd. as the transmission electron microscope, and image analysis software KS-400 manufactured by Carl Zeiss Co., Ltd. as the image analysis software, unless otherwise noted. In the present invention and the present specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is sandwiched between the particles. The term "particle" is used for representing a powder in some cases.

As a method of taking sample powder from the magnetic tape in order to measure the particle size, a method disclosed in a paragraph [0015] of JP2011-048878A can be used, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis of the particle, that is, a short axis length is measured in the measurement described above, a value (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of the definition of the particle size (1), the average particle size is an average long axis length, and in a case of the definition (2), the average particle size is an average plate diameter. In a case of the definition (3), the average particle size is an average diameter (also referred to as an average particle diameter).

A content amount (filling percentage) of the ferromagnetic powder of the magnetic layer is preferably in a range of 50% to 90 mass % and more preferably in a range of 60% to 90 mass %. A high filling percentage of the ferromagnetic powder in the magnetic layer is preferable from a viewpoint of improvement of recording density.

Binding Agent

The magnetic tape can be a coating type magnetic tape, and include the binding agent in the magnetic layer. The binding agent is one or more kinds of resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, methyl methacrylate, or the like, a cellulose resin such as nitrocellulose, an epoxy resin, a phenoxy resin, and a polyvinylalkylal resin such as polyvinyl acetal or polyvinyl butyral can be used alone or a plurality of the resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, descriptions disclosed in paragraphs [0028] to [0031] of JP2010-024113A can be referred to. An average molecular weight of the resin used as the binding agent can be, for example, equal to or more than 10,000 and equal to or less than 200,000 as a weight-average molecular weight. The weight-average molecular weight of the present invention and the present specification is, by gel permeation chromatography (GPC), a value obtained by performing polystyrene conversion of a value measured under the following measurement conditions. The weight-average molecular weight of the binding agent shown in Examples which will be described later is a value obtained by performing polystyrene conversion of a value measured under the following measurement conditions. The binding agent can be used in an amount of, for example, 1.0 to 30.0 parts by mass with respect to 100.0 parts by mass of the ferromagnetic powder.

GPC apparatus: HLC-8120 (manufactured by Tosoh Corporation)

Column: TSKgel Multipore HXL-M (manufactured by Tosoh Corporation, 7.8 mm inner diameter (ID)×30.0 cm)

Eluent: Tetrahydrofuran (THF)

Curing Agent

A curing agent can also be used together with a resin usable as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent can be included in the magnetic layer in a state of being reacted (crosslinked) with other components such as the binding agent, by proceeding the curing reaction in a magnetic layer forming step. The same applies to the layer formed using this composition in a case where the composition used for forming the other layer includes the curing agent. The preferred curing agent is a thermosetting compound, and polyisocyanate is suitable for this. For details of the polyisocyanate, descriptions disclosed in paragraphs [0124] and [0125] of JP2011-216149A can be referred to. The curing agent can be used in a composition for forming the magnetic layer in an amount of, for example, 0 to 80.0 parts by mass, and preferably 50.0 to 80.0 parts by mass, from a viewpoint of improvement of an intensity of the magnetic layer, with respect to 100.0 parts by mass of the binding agent.

Additive

The magnetic layer may include, as necessary, one or more additives. As an example of the additive, the curing agent described above can be used. In addition, examples of the additive which can be included in the magnetic layer include non-magnetic powder (for example, inorganic powder or carbon black), a lubricant, a dispersing agent, a dispersing assistant, a fungicide, an antistatic agent, and an antioxidant. For example, regarding the lubricant, the reference can be made to paragraphs [0030] to [0033], [0035], and [0036] of JP2016-126817A. The lubricant may be contained in the non-magnetic layer described later. For the lubricant that can be contained in the non-magnetic layer, the reference can be made to paragraphs [0030], [0031], and [0034] to [0036] of JP2016-126817A. For the dispersing agent, the reference can be made to paragraphs [0061] and [0071] of JP2012-133837A. The dispersing agent may be added to a composition for forming the non-magnetic layer. For the dispersing agent which can be added in the composition for forming the non-magnetic layer, the reference can be made to a paragraph [0061] of JP2012-133837A. In addition, as the non-magnetic powder which can be contained in the magnetic layer, non-magnetic powder which can function as an abrasive, or non-magnetic powder which can function as a protrusion forming agent which forms protrusions suitably protruded from the surface of the magnetic layer (for example, non-magnetic colloidal particles) is used. An average particle size of a colloidal silica (silica colloidal particles) shown in Examples which will be described later is a value obtained by a method disclosed in a paragraph [0015] of JP2011-048878A as a method of measuring an average particle diameter. As the additives, a commercially available product can be suitably selected or manufactured by a well-known method according to the desired properties, and any amount thereof can be used. An example of the additive that can be used to improve the dispersibility of an abrasive in the magnetic layer containing the abrasive includes the dispersing agent described in paragraphs [0012] to [0022] of JP2013-131285A.

The magnetic layer described above can be provided on the surface of the non-magnetic support directly or indirectly via the non-magnetic layer.

Non-Magnetic Layer

Next, the non-magnetic layer will be described. The magnetic tape may have the magnetic layer directly on the surface of the non-magnetic support, or may have the magnetic layer on the surface of the non-magnetic support via the non-magnetic layer containing the non-magnetic powder. The non-magnetic powder used in the non-magnetic layer may be a powder of an inorganic substance or powder of organic substance. In addition, carbon black and the like can be used. Examples of the powder of the inorganic substance include powders of metal, metal oxide, metal carbonate, metal sulfate, metal nitride, metal carbide, and metal sulfide. These non-magnetic powders can be purchased as a commercially available product or can be manufactured by a well-known method. For details thereof, the reference can be made to paragraphs [0146] to [0150] of JP2011-216149A. For carbon black which can be used in the non-magnetic layer, the reference can be made to paragraphs [0040] and [0041] of JP2010-024113A. The content amount (filling percentage) of the non-magnetic powder of the non-magnetic layer is preferably in a range of 50% to 90 mass % and more preferably in a range of 60% to 90 mass %.

The non-magnetic layer can include the binding agent and can also include the additive. With respect to other details of the binding agent or the additive of the non-magnetic layer, the well-known technique regarding the non-magnetic layer can be applied. In addition, in regards to the type and the content amount of the binding agent, and the type and the content amount of the additive, for example, the well-known technique regarding the magnetic layer can be applied.

In the present invention and the present specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and a coercivity.

Back Coating Layer

The magnetic tape may or may not include a back coating layer including non-magnetic powder on a surface side of the non-magnetic support opposite to the surface side provided with the magnetic layer. Preferably, the back coating layer contains either one or both of carbon black and inorganic powder. The back coating layer can include the binding agent and can also include the additive. With respect to the binding agent and the additive of the back coating layer, the well-known technique regarding the back coating layer can be applied, and the well-known technique regarding the formulation of the magnetic layer and/or the non-magnetic layer can be applied. For example, for the back coating layer, the reference can be made to paragraphs [0018] to [0020] of JP2006-331625A and page 4, line 65, to page 5, line 38, of U.S. Pat. No. 7,029,774B.

Various Thicknesses

In regards to the thickness (total thickness) of the magnetic tape, it is required to increase the recording capacity (higher capacity) of the magnetic tape with the enormous increase in the amount of information in recent years. As a means for increasing the recording capacity, it is possible to reduce the thickness of the magnetic tape (hereinafter, it is also described as "thinning".) and increase the length of the magnetic tape accommodated in one roll of the magnetic tape cartridge. From this point of view, the thickness (total thickness) of the magnetic tape is preferably equal to or less than 5.6 μm, more preferably equal to or less than 5.5 μm, still more preferably equal to or less than 5.4 μm, and further more preferably equal to or less than 5.3 μm. In addition, from the viewpoint of easy handling, the thickness of the magnetic tape is preferably equal to or more than 3.0 μm, more preferably equal to or more than 3.5 μm. With respect to the thickness of the magnetic tape, the value of TC tends to increase as the thickness decreases.

The thickness (total thickness) of the magnetic tape can be measured by the following method.

Ten tape samples (for example, 5 to 10 cm in length) are cut out from a random part of the magnetic tape, and the tape samples are stacked to measure the thickness. A value (thickness per one tape sample) obtained by dividing the measured thickness by ¹⁄₁₀ is defined as the tape thickness. The thickness measurement can be performed using a known measuring device capable of measuring the thickness on the order of 0.1 μm.

The thickness of the non-magnetic support is preferably 3.0 to 5.0 μm.

The thickness of the magnetic layer can be optimized according to the amount of saturation magnetization of the magnetic head used, a head gap length, a band of a recording signal, and the like, and is generally 0.01 μm to 0.15 μm, preferably 0.02 μm to 0.12 μm, and more preferably 0.03 μm to 0.1 μm from the viewpoint of high-density recording. The magnetic layer may be at least a single layer, the magnetic layer may be separated into two or more layers having different magnetic characteristics, and a configuration in regards to a well-known multilayered magnetic layer can be applied as the magnetic layer. A thickness of the magnetic layer in a case where the magnetic layer is separated into two or more layers is defined as a total thickness of the layers.

The thickness of the non-magnetic layer is, for example, 0.1 to 1.5 μm, preferably 0.1 to 1.0 μm.

A thickness of the back coating layer is preferably equal to or less than 0.9 μm, and more preferably 0.1 to 0.7 μm.

Various thicknesses such as the thickness of the magnetic layer can be obtained by the following method.

After exposing the cross section in the thickness direction of the magnetic tape with an ion beam, the cross section in the exposed cross section is observed with a scanning electron microscope. Various thicknesses can be obtained as an arithmetic average of thicknesses obtained at two randomly points in cross section observation. Alternatively, the various thicknesses can be obtained as a design thicknesses calculated from manufacturing conditions and the like.

Manufacturing Step

Preparation of Composition for Forming Each Layer

Moreover, a step of preparing a composition for forming the magnetic layer, the non-magnetic layer, or the back coating layer can generally include at least a kneading step, a dispersing step, and a mixing step provided before and after these steps as necessary. Each step may be divided into two or more stages. The component used in the preparation of the composition for forming each layer may be added at an initial stage or in a middle stage of each step. As a solvent, one kind or two or more kinds of various kinds of solvents usually used for manufacturing the coating type magnetic recording medium can be used. With respect to the solvent, for example, the reference can be made to paragraph [0153] of JP2011-216149A. In addition, each component may be divided and added in two or more steps. For example, a binding agent may be divided and added in a kneading step, a dispersing step, and a mixing step for adjusting viscosity after dispersing. In order to manufacture the above magnetic tape, known manufacturing techniques can be used in various steps. In the kneading step, it is preferable to use a kneader having a strong kneading force such as an open kneader, a continuous kneader, a pressure kneader, or an extruder. With respect to details of these kneading treatments, the reference can be made to JP1989-106338A (JP-H01-106338A) and JP1989-079274A (JP-H01-079274A). As a dispersing device, a well-known dispersing device can be used. Filtering may be performed by a known method at a random stage of preparing the composition for forming each layer. The filtering can be performed by using a filter, for example. As a filter used in the filtering, a filter having a pore diameter of 0.01 to 3 μm (for example, a filter made of glass fiber or a filter made of polypropylene) can be used, for example.

Coating Step

The magnetic layer can be formed by directly coating the composition for forming the magnetic layer on the surface of the non-magnetic support or performing multilayer coating of the composition for forming the magnetic layer with the composition for forming the non-magnetic layer in order or at the same time. The back coating layer can be formed by coating a composition for forming the back coating layer to the surface of the non-magnetic support opposite to the (alternatively, the non-magnetic layer and/or the magnetic layer are provided in sequence) surface having the non-magnetic layer and/or the magnetic layer. With respect to details of the coating for forming each layer, the reference can be made to a paragraph [0066] of JP2010-231843A.

Other Steps

Known techniques can be applied to other various steps for manufacturing the magnetic tape. With respect to various steps, the reference can be made to paragraphs [0067] to [0070] of JP2010-231843A, for example. For example, a coating layer of the composition for forming the magnetic layer can be subjected to an orientation treatment in an orientation zone while the coating layer is in a wet state. With respect to the orientation treatment, the various well-known techniques such as a description disclosed in a paragraph [0052] of JP2010-024113A can be applied. For example, a vertical orientation treatment can be performed by a well-known method such as a method using a polar opposing magnet. In the orientation zone, a drying speed of the coating layer can be controlled depending on a temperature and a flow rate of dry air and/or a transportation speed in the orientation zone. In addition, the coating layer may be preliminarily dried before the transportation to the orientation zone.

By going through various steps, a long magnetic tape raw material can be obtained. The obtained magnetic tape raw material is cut (slit) into a width of the magnetic tape to be wound around the magnetic tape cartridge by a known cutting machine. The width is determined according to the standard and is usually ½ inch. 1 inch=12.65 mm.

A servo pattern is formed on the magnetic tape obtained by slitting. Details of the servo pattern will be described later.

Heat Treatment

In one aspect, the magnetic tape may be a magnetic tape manufactured through the following heat treatment. In a case where the following heat treatment is performed, the TDSage value tends to be small.

As the heat treatment, a magnetic tape cut into a width determined according to a standard by slitting is wound around a core member, and the heat treatment can be performed in a wound state.

In one aspect, the heat treatment is performed in a state in which the magnetic tape is wound around a core member (hereinafter, referred to as a "winding core for the heat treatment".) for the heat treatment, the magnetic tape after the heat treatment is wound around a reel of the magnetic tape cartridge, and the magnetic tape cartridge in which the magnetic tape is wound around the reel can be manufactured.

The winding core for the heat treatment can be made of metal, resin, paper, or the like. A material of the winding core for the heat treatment is preferably a material having high stiffness from the viewpoint of suppressing the occurrence of winding failures such as spokes. From this point, the winding core for the heat treatment is preferably made of metal or resin. In addition, as an index of stiffness, a bending elastic modulus of the material of the winding core for the heat treatment is preferably equal to or more than 0.2 GPa, more preferably equal to or more than 0.3 GPa. On the other hand, since high stiffness materials are generally expensive, the use of a winding core for the heat treatment made of a material having a stiffness exceeding a stiffness capable of suppressing the occurrence of the winding failures leads to an increase in cost. Considering the above points, the bending elastic modulus of the material of the winding core for the heat treatment is preferably equal to or less than 250 GPa. The bending elastic modulus is a value measured according to an international organization for standardization (ISO) 178, and the bending elastic modulus of various materials is known. In addition, the winding core for the heat treatment may be a solid or hollow core member. In the case of a hollow shape, the wall thickness is preferably equal to or more than 2 mm from the viewpoint of maintaining the stiffness. Further, the winding core for the heat treatment may or may not have a flange.

It is preferable that a magnetic tape of longer than a length (hereinafter, referred to as a "final product length".) to be finally accommodated in the magnetic tape cartridge is prepared as the magnetic tape to be wound around the winding core for the heat treatment, and the heat treatment is performed by placing the magnetic tape under a heat treatment environment while being wound around the winding core for the heat treatment. It is preferable that the length of the magnetic tape wound around the winding core for the heat treatment is equal to or longer than the final product length, and is defined as the "final product length+α" from the viewpoint of easiness of winding around the winding core for the heat treatment and the like. This α is preferably equal to or more than 5 m from the viewpoint of easiness of winding. A tension during winding on the winding core for the heat treatment is preferably equal to or more than 0.1 N (newton). In addition, from the viewpoint of suppressing the occurrence of excessive deformation, the tension during winding around the winding core for the heat treatment is preferably equal to or less than 1.5 N, more preferably equal to or less than 1.0 N. An outer diameter of the winding core for the heat treatment is preferably equal to or more than 20 mm, and more preferably equal to or more than 40 mm, from the viewpoint of easiness of winding and suppression of coiling (curl in the longitudinal direction). Further, the outer diameter of the winding core for the heat treatment is preferably equal to or less than 100 mm, more preferably equal to or less than 90 mm. A width of the winding core for the heat treatment may be equal to or larger than a width of the magnetic tape wound around the winding core. In addition, in a case where the magnetic tape is removed from the winding core for the heat treatment after the heat treatment, it is preferable to remove the magnetic tape from the winding core for the heat treatment after the magnetic tape and the winding core for the heat treatment have been sufficiently cooled in order to suppress unintended tape deformation during the removal operation. It is preferable that the removed magnetic tape is once wound on another winding core (referred to as a "winding core for temporary winding"), and then the magnetic tape is wound on the reel (generally, the outer diameter is about 40 to 50 mm.) of the magnetic tape cartridge from the winding core for temporary winding. As a result, the magnetic tape can be wound on the reel of the magnetic tape cartridge while maintaining a relationship between the inner side and the outer side with respect to the winding core for the heat treatment of the magnetic tape during the heat treatment. With respect to the details of the winding core for temporary winding and the tension in a case of winding the magnetic tape around the winding core, the above description regarding the winding core for the heat treatment can be referred to. In an aspect in which the heat treatment is applied to a magnetic tape having a length of "final product length+α", the length of "+α" may be cut off at a random stage. For example, in one aspect, the magnetic tape for the final product length may be wound from the winding core for temporary winding to the reel of the magnetic tape cartridge, and the remaining "+α" length may be cut off. From the viewpoint of reducing the part to be cut off and discarded, the above α is preferably equal to or less than 20 m.

A specific aspect of the heat treatment performed in the state of being wound around the core member as described above will be described below.

An ambient temperature for the heat treatment (hereinafter, referred to as a "heat treatment temperature") is preferably equal to or more than 40° C., and more preferably equal to or more than 50° C. On the other hand, from the viewpoint of suppressing excessive deformation, the heat treatment temperature is preferably equal to or less than 75° C., more preferably equal to or less than 70° C., and still more preferably equal to or less than 65° C.

A weight absolute humidity of the atmosphere in which the heat treatment is performed is preferably equal to or more than 0.1 g/kg Dryair, and more preferably equal to or more than 1 g/kg Dryair. An atmosphere having the weight absolute humidity in the above range is preferable since it can be prepared without using a special apparatus for reducing moisture. On the other hand, the weight absolute humidity is preferably equal to or less than 70 g/kg Dryair, and more preferably equal to or less than 66 g/kg Dryair, from the viewpoint of suppressing reduction in workability due to dew condensation. The heat treatment time is preferably equal to or more than 0.3 hours, more preferably equal to or more than 0.5 hours. In addition, the heat treatment time is preferably equal to or less than 48 hours from the viewpoint of production efficiency.

Formation of Servo Pattern

A "formation of the servo pattern" can also be referred to as "recording a servo signal". The formation of the servo pattern will be described below.

The servo pattern is usually formed along the longitudinal direction of the magnetic tape. A method of control (servo control) using the servo signal includes timing-based servo (TBS), amplitude servo, frequency servo, and the like.

As shown in a European computer manufacturers association (ECMA)—319 (June 2001), magnetic tapes (generally called "LTO tape") conforming to a linear tape-open (LTO) standard employ a timing-based servo method. In the timing-based servo method, the servo pattern is configured by continuously disposing a plurality of pairs of magnetic stripes (also called a "servo stripe") which are not parallel to each other in the longitudinal direction of the magnetic tape. In the present invention and the present specification, a "timing-based servo pattern" refers to a servo pattern that enables head tracking in the servo system of the timing-based servo method. As described above, the reason why the servo pattern is composed of pairs of magnetic stripes which are not parallel to each other is to teach the servo signal reading element passing on the servo pattern a passing position. Specifically, the pair of magnetic stripes are formed such that an interval thereof continuously changes along the width direction of the magnetic tape, and a relative position between the servo pattern and the servo signal reading element can be known by reading the interval by the servo signal reading element. This relative position information enables tracking of the data track. Therefore, a plurality of servo tracks are usually set on the servo pattern along the width direction of the magnetic tape.

The servo band is configured with the servo pattern continuous in the longitudinal direction of the magnetic tape. Usually, a plurality of servo bands are provided on the magnetic tape. For example, the number of LTO tapes is five. A region sandwiched between two servo bands adjacent to each other is the data band. The data band is configured with a plurality of data tracks, and each data track corresponds to each servo track.

In addition, in one aspect, as shown in JP2004-318983A, information indicating a servo band number (referred to as "servo band ID (identification)" or "UDIM (Unique Data Band Identification Method) information") is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, since the recorded servo band ID is unique for each servo band, the servo band can be uniquely specified only by reading one servo band with a servo signal reading element.

It should be noted that as a method for uniquely specifying the servo band, there is a method using a staggered method as shown in ECMA-319 (June 2001). In the staggered method, a group of a plurality of pairs of magnetic stripes that are disposed continuously in the longitudinal direction of the magnetic tape and are not parallel to each other (servo stripes) is recorded so as to be shifted in a longitudinal direction of the magnetic tape for each servo band. Since this combination of shifting methods between servo bands adjacent to each other is unique throughout the magnetic tape, it is possible to uniquely specify the servo band in a case of reading a servo pattern with two servo signal reading elements.

As shown in ECMA-319 (June 2001), information indicating a position of the magnetic tape in the longitudinal direction (also referred to as "Longitudinal Position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming the servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, equal to or less than 1 μm, 1 to 10 μm, equal to or more than 10 μm, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a magnetic field in unidirection along a longitudinal direction of the magnetic tape. A second method is vertical DC erasing of applying a magnetic field in unidirection along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. It should be noted that as shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where the magnetic pattern is transferred to, using the gap, a magnetic tape that has been subjected to horizontal DC erasing, a servo signal obtained by reading the formed servo pattern has a bipolar pulse shape.

Magnetic Tape Cartridge

One aspect of the present invention relates to a magnetic tape cartridge including the magnetic tape.

Details of the magnetic tape included in the tape cartridge are as described above.

In the magnetic tape cartridge, generally, the magnetic tape is accommodated inside a cartridge main body in a state of being wound around a reel. The reel is rotatably comprised inside the cartridge main body. As the magnetic tape cartridge, a single reel type magnetic tape cartridge having one reel inside the cartridge main body and a dual reel type magnetic tape cartridge having two reels inside the cartridge main body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed in a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, the data is recorded and/or reproduced as the magnetic head and the magnetic layer surface of the magnetic tape come into contact with each other to be slid on each other. On the other hand, in the dual reel type magnetic tape cartridge, both the supply reel and the winding reel are provided inside the magnetic tape cartridge.

The magnetic tape cartridge may include a cartridge memory in one aspect. The cartridge memory can be, for example, a non-volatile memory, and the tension adjustment information is already recorded or tension adjustment information is recorded. The tension adjustment information is information for adjusting the tension applied in the longitudinal direction of the magnetic tape. With respect to the cartridge memory, the description below can be referred to.

The magnetic tape and the magnetic tape cartridge can be suitably used in the magnetic tape apparatus (in other words, a magnetic recording and reproducing system) for controlling the dimension in the width direction of the magnetic tape by adjusting the tension applied in the longitudinal direction of the magnetic tape.

Magnetic Tape Apparatus

One aspect of the present invention relates to the magnetic tape apparatus including the magnetic tape cartridge. In the magnetic tape apparatus, data can be recorded on the magnetic tape and/or data recorded on the magnetic tape can be reproduced by sliding the surface of the magnetic layer of the magnetic tape in contact with the magnetic head. The magnetic tape apparatus can attachably and detachably include a magnetic tape cartridge according to one aspect of the present invention.

The magnetic tape cartridge can be mounted to the magnetic tape apparatus comprising the magnetic head and used for recording and/or reproducing data. In the present invention and the present specification, the "magnetic tape apparatus" means an apparatus capable of performing at least one of recording data on the magnetic tape or reproducing data recorded on the magnetic tape. Such an apparatus is generally referred to as a drive. The magnetic head included in the magnetic tape apparatus can be the recording head capable of recording data on the magnetic tape, and can also be a reproducing head capable of reproducing data recorded on the magnetic tape. In addition, in one aspect, the magnetic tape apparatus can include both the recording head and the reproducing head as separate magnetic heads. In another aspect, the magnetic head included in the magnetic tape apparatus can have a configuration in which both the recording element and a reproducing element are comprised in one magnetic head. As the reproducing head, a magnetic head (MR head) including a magneto resistive (MR) element capable of reading information recorded on the magnetic tape with high sensitivity as a reproducing element is preferable. As the MR head, various known MR heads (for example, a giant magneto resistive (GMR) head, a tunnel magneto resistive (TMR) head, and the like) can be used. In addition, the magnetic head that records data and/or reproduces data may include a servo pattern reading element. Alternatively, the magnetic head (servo head) comprising the servo pattern reading element may be included in the magnetic tape apparatus as a head different from the magnetic head that records data and/or reproduces data. For example, the magnetic head (hereinafter, also called a "recording and reproducing head") that records data and/or reproduces recorded data can include two servo signal reading elements, and each of the two servo signal reading elements can simultaneously read two servo bands adjacent to each other across the data band. One or more data elements can be disposed between the two servo signal reading elements. An element for recording data (recording element) and an element for reproducing data (reproducing element) are collectively referred to as "data element".

By reproducing data using a reproducing element having a narrow reproducing element width as a reproducing element, data recorded in high-density can be reproduced with high sensitivity. From this viewpoint, the reproducing element width of the reproducing element is preferably 0.8 μm or less. The reproducing element width of the reproducing element can be, for example, 0.3 μm or more. However, it is also preferable to fall below this value from the above viewpoint.

On the other hand, as the reproducing element width becomes narrower, a phenomenon such as defective reproduction due to off-track is more likely to occur. In order to suppress the occurrence of such a phenomenon, it is preferable to use the magnetic tape apparatus that controls the dimension in the width direction of the magnetic tape by adjusting the tension applied in the longitudinal direction of the magnetic tape.

Here, the "reproducing element width" means a physical dimension of the reproducing element width. Such physical dimensions can be measured with an optical microscope, a scanning electron microscope, or the like.

In a case of recording data and/or reproducing recorded data, first, tracking using the servo signal can be performed. That is, by making the servo signal reading element follow a predetermined servo track, the data element can be controlled so as to pass over the target data track. The movement of the data track is performed by changing the servo track read by the servo signal reading element in the tape width direction.

In addition, the recording and reproducing head can also perform recording and/or reproduction to other data bands. In that case, the servo signal reading element may be moved to a predetermined servo band by using the UDIM information described above, and tracking for the servo band may be started.

Figure 2:
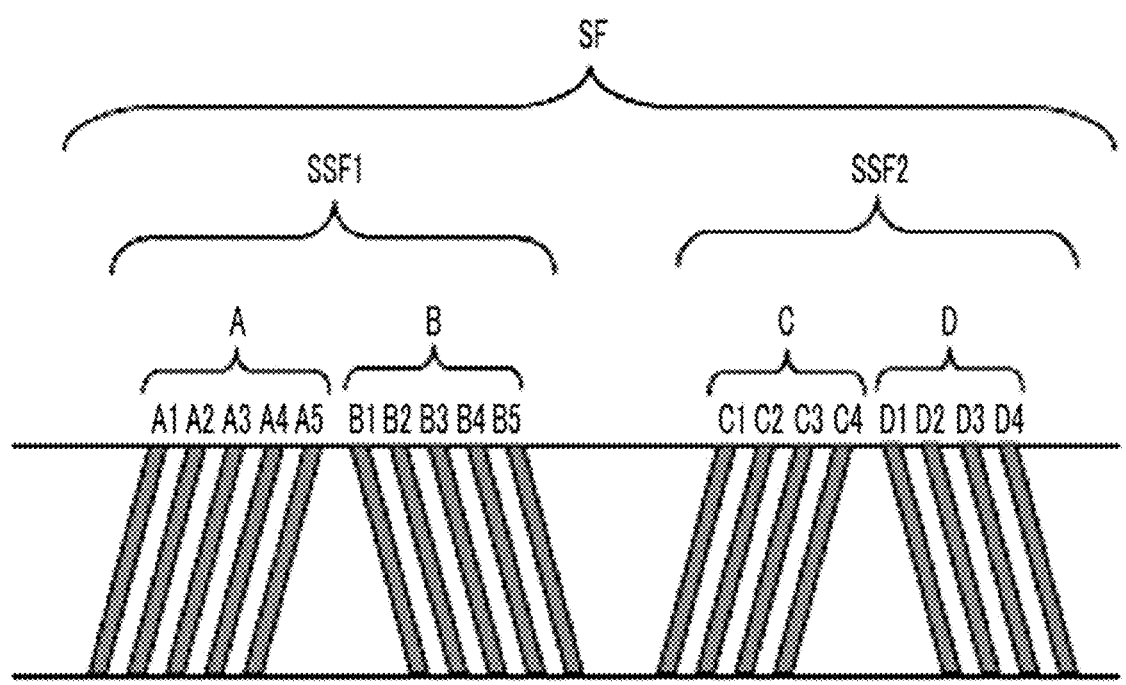
FIG. 2 shows a disposition example of a servo pattern of a linear-tape-open (LTO) Ultrium format tape.

FIG. 1 shows a disposition example of the data band and the servo band. In FIG. 1, in the magnetic layer of a magnetic tape MT, a plurality of servo bands 1 are sandwiched between the guide bands 3. A plurality of regions 2 each of which is sandwiched between two servo bands are data bands. The servo pattern is a magnetization region, and is formed by magnetizing a specific region of the magnetic layer with the servo write head. A region magnetized by the servo write head (a position where the servo pattern is formed) is defined by the standard. For example, in an LTO Ultrium format tape which is based on a local standard, a plurality of servo patterns tilted with respect to a tape width direction as shown in FIG. 2 are formed on a servo band, in a case of manufacturing a magnetic tape. Specifically, in FIG. 2, a servo frame SF on the servo band 1 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for identifying the servo frames. FIG. 2 shows one servo frame for illustration. In practice, however, a plurality of servo frames are disposed in each servo band in the running direction in the magnetic layer of the magnetic tape on which the head tracking of the timing-based servo method is performed. In FIG. 2, an arrow shows the running direction. For example, an LTO Ultrium format tape usually has at least 5,000 servo frames per meter of tape length in each servo band of the magnetic layer.

The magnetic tape apparatus preferably has a tension adjusting mechanism for controlling the dimension in the width direction of the magnetic tape by adjusting the tension applied in the longitudinal direction of the magnetic tape. An example of such a magnetic tape apparatus will be described below with reference to FIG. 3. However, the present invention is not limited to an example shown in FIG. 3.

Configuration of Magnetic Tape Apparatus

Figure 3:
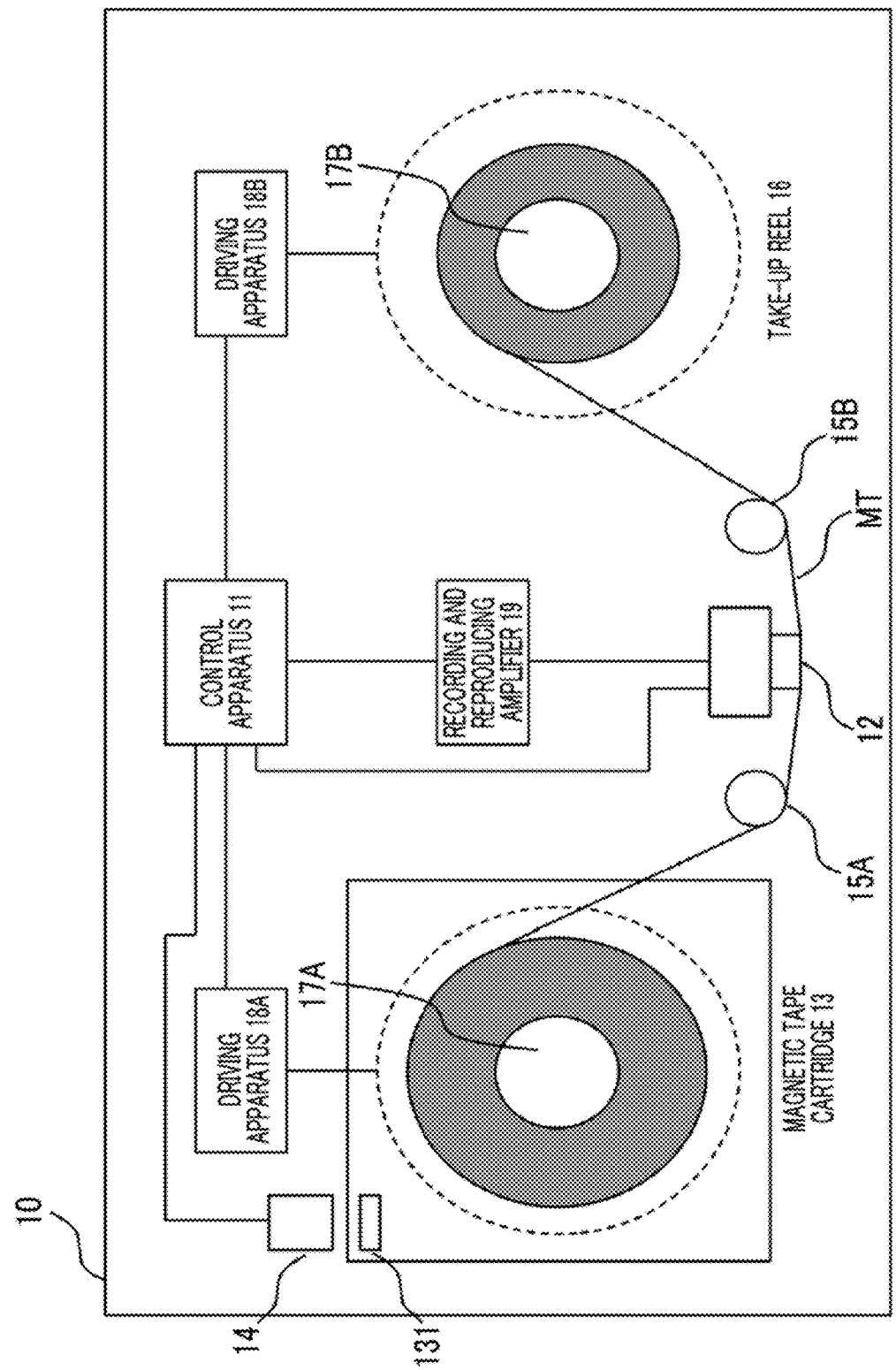
FIG. 3 is a schematic view showing an example of a magnetic tape apparatus.

A magnetic tape apparatus 10 shown in FIG. 3 controls a recording and reproducing head unit 12 according to an instruction from the control apparatus 11, and records and reproduces data on the magnetic tape MT.

The magnetic tape apparatus 10 has a configuration capable of detecting and adjusting tension applied in the longitudinal direction of the magnetic tape from spindle motors 17A and 17B for controlling rotation of a magnetic tape cartridge reel and a take-up reel and their driving apparatuses 18A and 18B.

The magnetic tape apparatus 10 has a configuration in which a magnetic tape cartridge 13 can be loaded.

The magnetic tape apparatus 10 has a cartridge memory reading and writing apparatus 14 capable of reading and writing the cartridge memory 131 in the magnetic tape cartridge 13.

From a magnetic tape cartridge 13 mounted on the magnetic tape apparatus 10, an end portion or a leader pin of the magnetic tape MT is pulled out by an automatic loading mechanism or manually, and the magnetic layer surface of the magnetic tape MT passes on the recording and reproducing head through guide rollers 15A and 15B in a direction contacting with a recording and reproducing head surface of the recording and reproducing head unit 12, and the magnetic tape MT is wound on a take-up reel 16.

The rotation and torque of a spindle motor 17A and a spindle motor 17B are controlled by a signal from the control apparatus 11, and the magnetic tape MT is run at a random speed and tension. A servo pattern previously formed on the magnetic tape can be used to control the tape speed. A tension detection mechanism may be provided between the magnetic tape cartridge 13 and the take-up reel 16 to detect the tension. The tension may be adjusted by using the guide rollers 15A and 15B in addition to the control by the spindle motors 17A and 17B.

The cartridge memory reading and writing apparatus 14 is configured to be able to read and write information in the cartridge memory 131 according to instructions from the control apparatus 11. As a communication method between the cartridge memory reading and writing apparatus 14 and the cartridge memory 131, for example, an international organization for standardization (ISO) 14443 method can be adopted.

The control apparatus 11 includes, for example, a controller, a storage unit, a communication unit, and the like.

The recording and reproducing head unit 12 is composed of, for example, a recording and reproducing head, a servo tracking actuator for adjusting a position of the recording and reproducing head in the track width direction, a recording and reproducing amplifier 19, a connector cable for connecting to the control apparatus 11, and the like. The recording and reproducing head is composed of, for example, the recording element for recording data on the magnetic tape, the reproducing element for reproducing data on the magnetic tape, and the servo signal reading element for reading the servo signal recorded on the magnetic tape. For example, one or more recording elements, reproducing elements, and servo signal reading elements are mounted in one magnetic head. Alternatively, each element may be separately provided in a plurality of magnetic heads according to the running direction of the magnetic tape.

The recording and reproducing head unit 12 is configured to be able to record data on the magnetic tape MT in response to an instruction from the control apparatus 11. In addition, the data recorded on the magnetic tape MT is configured to be able to be reproduced in response to an instruction from the control apparatus 11.

The control apparatus 11 has a mechanism for obtaining the running position of the magnetic tape from the servo signal read from the servo band in a case where the magnetic tape MT is running, and controlling the servo tracking actuator such that the recording element and/or the reproducing element are positioned at a target running position (track position). The control of the track position is performed by feedback control, for example. The control apparatus 11 has a mechanism for obtaining a servo band interval from servo signals read from two adjacent servo bands in a case where the magnetic tape MT is running. In addition, a mechanism has a mechanism for adjusting the tension in the longitudinal direction of the magnetic tape by controlling the torque of the spindle motor 17A and the spindle motor 17B and/or the guide rollers 15A and 15B such that the servo band interval becomes the target value. The tension is adjusted by feedback control, for example. Further, the control apparatus 11 can store the obtained information on the servo band interval in a storage unit inside the control apparatus 11, a cartridge memory 131, an external connection device, or the like.

In the magnetic tape apparatus, the tension applied in the longitudinal direction of the magnetic tape can be variably adjusted during recording and/or reproduction. In the range in which the tension adjustment is performed (hereinafter, it is also described as "tension adjustment range"), the minimum tension can be, for example, equal to or more than 0.10 N, and from the viewpoint of improving running stability, it is preferable to be equal to or more than 0.20 N. In addition, in the above tension adjustment range, the maximum tension can be, for example, equal to or less than 1.30 N, and is preferably equal to or less than 1.20 N from the viewpoint of improving running stability. It is supposed that the stability of the servo tracking is improved by setting the tension adjustment range to the range of 0.2 N to 1.2 N, which is considered to lead to the improvement of the running stability. The value of the tension for the tension adjustment range is the value of the tension used by the control apparatus of the magnetic tape apparatus to control the tension adjusting mechanism as the tension to be applied in the longitudinal direction of the magnetic tape during the tension adjustment. In addition, in the magnetic tape apparatus, the tension actually applied in the longitudinal direction of the magnetic tape in a case where the tension is adjusted can be detected by providing the tension detection mechanism between the magnetic tape cartridge 13 and the take-up reel 16 in FIG. 3, as described above, for example. Further, for example, the control apparatus of the magnetic tape apparatus or the like can control such that the minimum tension does not fall below a value defined or recommended by a standard or the like and/or such that the maximum tension does not exceed a value defined or recommended by a standard or the like.

EXAMPLES

Hereinafter, one aspect of the present invention will be described based on Examples. Here, the present invention is not limited to the aspects shown in the Examples. Unless otherwise specified, the indications of "parts" and "%" described below indicate "parts by mass" and "mass %". "eq" is an equivalent and is a unit that cannot be converted into an SI unit.

In addition, the following various steps and operations are performed in an environment of a temperature of 20° C. to 25° C. and a relative humidity of 40% to 60% unless otherwise specified.

In Table 1, "PEN" indicates a polyethylene naphthalate support and "PET" indicates a polyethylene terephthalate support. The moisture content and Young's modulus in Table 1 are values measured by the method described above.

Example 1

(1) Preparation of Alumina Dispersion 100.0 parts of alumina powder (HIT-80 manufactured by Sumitomo Chemical Co., Ltd.) having a brunauer-emmett-teller (BET) specific surface area of 20 m$^2$/g and a gelatinization ratio of about 65% are mixed with 3.0 parts of 2,3-dihydroxynaphthalene (manufactured by Tokyo Chemcal Industries Co., Ltd), 31.3 parts of a 32% solution (the solvent is a mixture of methyl ethyl ketone and toluene.) of a polyester polyurethane resin (UR-4800 manufactured by Toyobo Co., Ltd. (amount of polar group: 80 meq/kg)) having an SO$_3$Na group as a polar group, and 570.0 parts of a mixed solution of methyl ethyl ketone and cyclohexanone 1:1 (mass ratio) as a solvent, and dispersed by a paint shaker for 5 hours in the presence of zirconia beads. After the dispersion, a dispersion liquid and the beads are separated by a mesh to obtain an alumina dispersion.

(2) Formulation of Composition for Forming Magnetic Layer

Magnetic Liquid

Ferromagnetic powder: 100.0 parts

Hexagonal barium ferrite powder having an average particle size (average plate diameter) of 21 nm ("BaFe" in Table 1)

SO$_3$Na group-containing polyurethane resin: 14.0 parts

Weight-average molecular weight: 70,000, SO$_3$Na group: 0.2 meq/g
Cyclohexanone: 150.0 parts
Methyl ethyl ketone: 150.0 parts
Abrasive liquid
Alumina dispersion prepared in (1) above: 6.0 parts
Silica sol (protrusion forming agent liquid)
Colloidal silica (average particle size: 120 nm): 2.0 parts
Methyl ethyl ketone: 1.4 parts
Other components
Stearic acid: 2.0 parts
Stearic acid amide: 0.2 parts
Butyl stearate 2.0 parts
Polyisocyanate (CORONATE (registered trademark) L manufactured by Tosoh Corporation): 2.5 parts
Finishing additive solvent
Cyclohexanone: 200.0 parts
Methyl ethyl ketone: 200.0 parts
(3) Formulation of Composition for Forming Non-Magnetic Layer
Non-magnetic inorganic powder: 100.0 parts of α-iron oxide
Average particle size (average long axis length): 0.15 μm
Average acicular ratio: 7
BET specific surface area: 52 m$^2$/g
Carbon black: 20.0 parts
Average particle size: 20 nm
SO$_3$Na group-containing polyurethane resin: 18.0 parts
Weight-average molecular weight: 70,000, SO$_3$Na group: 0.2 meq/g
Stearic acid: 2.0 parts
Stearic acid amide: 0.2 parts
Butyl stearate 2.0 parts
Cyclohexanone: 300.0 parts
Methyl ethyl ketone: 300.0 parts
(4) Formulation of Composition for Forming Back Coating Layer
Carbon black: 100.0 parts
Dibutylphthalate (DBP) oil absorption of 74 cm$^3$/100 g
Nitrocellulose: 27.0 parts
Polyester polyurethane resin containing a sulfonic acid group and/or a salt thereof: 62.0 parts
Polyester resin: 4.0 parts
Alumina powder (BET specific surface area: 17 m$^2$/g): 0.6 parts
Methyl ethyl ketone: 600.0 parts
Toluene: 600.0 parts
Polyisocyanate (CORONATE (registered trademark) L manufactured by Tosoh Corporation): 15.0 parts
(5) Preparation of Composition for Forming Each Layer The composition for forming the magnetic layer is prepared by the following method. The above magnetic liquid is prepared by dispersing each component for 24 hours (beads-dispersion) using a batch type vertical sand mill. As dispersion beads, zirconia beads having a bead diameter of 0.5 mm are used. Using the sand mill, the prepared magnetic liquid, the abrasive liquid, and other components (silica sol, other components, and finishing additive solvent) are mixed and beads-dispersed for 5 minutes, and then the treatment (ultrasound dispersion) is performed for 0.5 minutes with a batch type ultrasonic apparatus (20 kHz, 300 W). Then, filtering is performed using a filter having a pore diameter of 0.5 μm to prepare the composition for forming the magnetic layer.

The composition for forming the non-magnetic layer is prepared by the following method. The above components excluding lubricants (stearic acid, stearic acid amide, and butyl stearate) are kneaded and diluted with an open kneader, and then dispersion treatment is performed with a horizontal bead mill disperser. After that, the lubricants (stearic acid, stearic acid amide, and butyl stearate) are added and stirring and mixing are performed by a dissolver stirrer to prepare the composition for forming the non-magnetic layer.

The composition for forming the back coating layer is prepared by the following method. The above components except polyisocyanate are introduced into the dissolver stirrer, stirred at a circumferential speed of 10 m/sec for 30 minutes, and then dispersion treatment is performed by the horizontal bead mill disperser. Then, polyisocyanate is added, and the mixture is stirred and mixed by the dissolver stirrer to prepare the composition for forming the back coating layer.

(6) Method for Manufacturing Magnetic Tape and Magnetic Tape Cartridge

A non-magnetic layer is formed by coating and drying the composition for forming the non-magnetic layer prepared in (5) above on the surface of the biaxially stretched support of the type and thickness shown in Table 1 such that the thickness after drying becomes 1.0 μm. Next, the composition for forming the magnetic layer prepared in above-described (5) is coated on the non-magnetic layer such that the thickness after drying becomes 0.1 μm to form a coating layer. Thereafter, while the coating layer of the composition for forming the magnetic layer is in an undried state, a magnetic field having a magnetic field intensity of 0.3 T is applied in a direction perpendicular to the surface of the coating layer to perform a vertical orientation treatment, and then the magnetic layer is dried to form the magnetic layer. Thereafter, the back coating layer is formed on the surface of the support opposite to the surface on which the non-magnetic layer and the magnetic layer are formed by coating and drying the composition for forming the back coating layer prepared in (5) above such that the thickness after drying becomes 0.5 μm.

Thereafter, a surface smoothing treatment (calender treatment) is performed at a calender temperature (a surface temperature of a calender roll) of 100 m/min speed, 300 kg/cm linear pressure, and 90° C. by using the calender roll composed of only metal roll.

Then, the long magnetic tape raw material is stored in a heat treatment furnace at an ambient temperature of 70° C. for heat treatment (heat treatment time: 36 hours). After the heat treatment, it is slit into a width of ½ inch to obtain a magnetic tape. By recording the servo signal on the magnetic layer of the obtained magnetic tape by a commercially available servo writer, a magnetic tape having data bands, servo bands, and guide bands disposed according to the linear tape-open (LTO) Ultrium format and having servo patterns (timing-based servo pattern) disposed and shaped according to the LTO Ultrium format on the servo bands is obtained. The servo pattern thus formed is a servo pattern according to the description in japanese industrial standards (JIS) X6175: 2006 and Standard ECMA-319 (June 2001). The total number of servo bands is 5, and the total number of data bands is 4.

The magnetic tape (length 970 m) after forming the servo pattern is wound around the winding core for the heat treatment, and the heat treatment is performed while being wound around the winding core. A resin-made solid core member (outer diameter: 50 mm) having a bending elastic modulus of 0.8 GPa is used as the winding core for the heat treatment, and the tension during winding is set to 0.6 N. The heat treatment is performed at the heat treatment temperature shown in Table 1 for 5 hours. The weight absolute humidity of the heat-treated atmosphere is 10 g/kg Dryair.

After the above heat treatment, the magnetic tape and the winding core for the heat treatment are sufficiently cooled, the magnetic tape is removed from the winding core for the heat treatment, the magnetic tape is wound onto the winding core for temporary winding, and then the magnetic tape of the final product length (960 m) is wound from the winding core for the temporary winding to the reel (reel outer diameter: 44 mm) of the magnetic tape cartridge (LTOUl-trium 7 data cartridge), the remaining 10 m is cut off, and a leader tape according to item 9 of Standard European computer manufacturers association (ECMA)-319 (June 2001) Section 3 is joined to a terminal of the cutting side by a splicing tape commercially available. As the winding core for temporary winding, a solid core member made of the same material as the winding core for the heat treatment and having the same outer diameter is used, and the tension during winding is set to 0.6 N.

Therefore, the magnetic tape cartridge of the Example 1 of the single reel type in which the magnetic tape having a length of 960 m is wound on the reel is manufactured.

Examples 2 to 10, Comparative Examples 1 to 2

The magnetic tape cartridge is manufactured in the same manner as in Example 1 except that the items in Table 1 are changed as shown in Table 1.

In the examples and comparative examples indicated by "-" in the column of "heat treatment temperature" in Table 1, a magnetic tape having a final product length of 960 m is accommodated in a magnetic tape cartridge without performing heat treatment while being wound around a winding core for the heat treatment.

Example 11

The magnetic tape cartridge is manufactured in the same manner as in Example 1 except that the hexagonal strontium ferrite powder ("SrFe1" in Table 1) manufactured as follows is used as the ferromagnetic powder.

1707 g of $SrCO_3$, 687 g of $H_3BO_3$, 1120 g of $Fe_2O_3$, 45 g of Al $(OH)_3$, 24 g of $BaCO_3$, 13 g of $CaCO_3$, and 235 g of $Nd_2O_3$ are weighed and mixed with a mixer to obtain a raw material mixture.

The obtained raw material mixture is melted with a platinum crucible at a melting temperature of 1390° C., and while stirring the melting liquid, a tap hole provided at the bottom of the platinum crucible is heated to tap the melting liquid in a rod shape at about 6 g/sec. A hot water is rolled and rapidly cooled with a water-cooled twin roller to manufacture an amorphous body.

280 g of the manufactured amorphous body is charged into an electric furnace, the temperature is increased to 635° C. (crystallization temperature) at a temperature increasing rate of 3.5° C./minute, and the amorphous body is kept at the same temperature for 5 hours to precipitate (crystallize) hexagonal strontium ferrite particles.

Then, the thus obtained crystallized product containing hexagonal strontium ferrite particles is roughly pulverized in a mortar, 1000 g of zirconia beads having a particle diameter of 1 mm and 800 mL of aqueous acetic acid solution having a concentration of 1% are added to a glass bottle, and dispersion treatment is performed for 3 hours by a paint shaker. Then, the obtained dispersion liquid is separated from the beads and placed in a stainless beaker. The dispersion liquid is allowed to stand at a liquid temperature of 100° C. for 3 hours to perform a dissolution treatment of glass components, and then precipitated with a centrifuge, washed by repeated decantation, and dried in a heating furnace at a furnace temperature of 110° C. for 6 hours to obtain a hexagonal strontium ferrite powder.

The hexagonal strontium ferrite powder thus obtained has an average particle size of 18 nm, an activation volume of 902 $nm^3$, an anisotropy constant Ku of $2.2 \times 10^5$ $J/m^3$, and a mass magnetization σs of 49 $A \cdot m^2/kg$.

12 mg of the sample powder is collected from the hexagonal strontium ferrite powder obtained above, and the sample powder is partially dissolved according to dissolution conditions exemplified above, and the elemental analysis of the obtained filtrate is performed by an ICP analyzer, and the surface layer portion content of neodymium atoms is obtained.

Separately, 12 mg of the sample powder is collected from the hexagonal strontium ferrite powder obtained above, and the sample powder is totally dissolved according to dissolution conditions exemplified above, and the elemental analysis of the obtained filtrate is performed by an ICP analyzer, and the bulk content of neodymium atoms is obtained.

The content (bulk content) of neodymium atoms with respect to 100 at % of iron atoms in the hexagonal strontium ferrite powder obtained above is 2.9 at %. In addition, the surface layer portion content of neodymium atoms is 8.0 at %. The ratio between the surface layer portion content and the bulk content, "surface layer portion content/bulk content" is 2.8, and it is confirmed that neodymium atoms are unevenly distributed in the surface layer of the particles.

The fact that the powder obtained above indicates a hexagonal ferrite crystal structure is confirmed by scanning CuKα rays under the conditions of a voltage of 45 kV and an intensity of 40 mA, and measuring the X-ray diffraction pattern under the following conditions (X-ray diffraction analysis). The powder obtained above indicates a crystal structure of a magnetoplumbite type (M-type) hexagonal ferrite. In addition, the crystal phase detected by X-ray diffraction analysis is a magnetoplumbite type single phase.

PANalytical X'PertPro diffractometer, PIXcel detector
Soller slit of incident beam and diffracted beam: 0.017 radians
Fixed angle of dispersion slit: ¼ degree
Mask: 10 mm
Anti-scatter slit: ¼ degree
Measurement mode: continuous
Measurement time per stage: 3 seconds
Measurement speed: 0.017 degrees per second
Measurement step: 0.05 degree Example 12

The magnetic tape cartridge is manufactured in the same manner as in Example 1 except that the hexagonal strontium ferrite powder ("SrFe2" in Table 1) manufactured as follows is used as the ferromagnetic powder.

1725 g of $SrCO_3$, 666 g of $H_3BO_3$, 1332 g of $Fe_2O_3$, 52 g of Al $(OH)_3$, 34 g of $CaCO_3$, and 141 g of $BaCO_3$ are weighed and mixed in a mixer to obtain a raw material mixture.

The obtained raw material mixture is dissolved with a platinum crucible at a melting temperature of 1380° C., and while stirring the melting liquid, a tap hole provided at the bottom of the platinum crucible is heated to melt the melting liquid in a rod shape at about 6 g/sec. A hot water is rolled and rapidly cooled with a water-cooled twin roller to manufacture an amorphous body.

280 g of the obtained amorphous body is charged into an electric furnace, the temperature is increased to 645° C. (crystallization temperature) at a temperature increasing rate, and the amorphous body is kept at the same temperature for 5 hours to precipitate (crystallize) hexagonal strontium ferrite particles.

Then, the thus obtained crystallized product containing hexagonal strontium ferrite particles is roughly pulverized in a mortar, 1000 g of zirconia beads having a particle diameter of 1 mm and 800 mL of aqueous acetic acid solution having a concentration of 1% are added to a glass bottle, and dispersion treatment is performed for 3 hours by a paint shaker. Then, the obtained dispersion liquid is separated from the beads and placed in a stainless beaker. The dispersion liquid is allowed to stand at a liquid temperature of 100° C. for 3 hours to perform a dissolution treatment of glass components, and then precipitated with a centrifuge, washed by repeated decantation, and dried in a heating furnace at a furnace temperature of 110° C. for 6 hours to obtain a hexagonal strontium ferrite powder.

The hexagonal strontium ferrite powder thus obtained has an average particle size of 19 nm, an activation volume of 1102 $nm^3$, an anisotropy constant Ku of $2.0 \times 10^5$ $J/m^3$, and a mass magnetization σs of 50 $A \cdot m^2/kg$.

Example 13

The magnetic tape cartridge is manufactured in the same manner as in Example 1 except that the ε-iron oxide powder ("ε-iron oxide" in Table 1) manufactured as follows is used as the ferromagnetic powder.

8.3 g of iron (III) nitrate 9 hydrate, 1.3 g of gallium (III) nitrate 8 hydrate, 190 mg of cobalt (II) nitrate 6 hydrate, 150 mg of titanium (IV) sulfate, and 1.5 g of polyvinylpyrrolidone (PVP) are dissolved in 90 g of pure water. While stirring the solution using a magnetic stirrer, in an air atmosphere, 4.0 g of an aqueous ammonia solution with a concentration of 25% is added under a condition of an ambient temperature of 25° C., and the solution is stirred for 2 hours under the temperature condition of an ambient temperature of 25° C. An aqueous citric acid solution obtained by dissolving 1 g of citric acid in 9 g of pure water is added to the obtained solution, and the solution is stirred for 1 hour. The powder precipitated after stirring is collected by centrifugation, washed with pure water, and dried in a heating furnace having a furnace temperature of 80° C.

800 g of pure water is added to the dried powder, and the powder is dispersed again in water to obtain a dispersion liquid. The temperature of the obtained dispersion liquid is increased to 50° C., and 40 g of the aqueous ammonia solution with a concentration of 25% is added dropwise while stirring. After stirring for 1 hour while maintaining the temperature of 50° C., 14 mL of tetraethoxysilane (TEOS) is added dropwise and stirred for 24 hours. 50 g of ammonium sulfate is added to the obtained reaction solution, the precipitated powder is collected by centrifugation, washed with pure water, and dried in a heating furnace at a furnace temperature of 80° C. for 24 hours to obtain a precursor of the ferromagnetic powder.

The obtained precursor of the ferromagnetic powder is loaded into a heating furnace having a furnace temperature of 1000° C. under an air atmosphere and subjected to a heat treatment for 4 hours.

The precursor of the heat-treated ferromagnetic powder is charged into an aqueous solution of 4 mol/L sodium hydroxide (NaOH), and is stirred for 24 hours while maintaining the liquid temperature at 70° C., whereby the silicate compound, which is impurities, is removed from the precursor of the heat-treated ferromagnetic powder.

Then, the ferromagnetic powder from which the silicate compound is removed is collected by centrifugation and washed with pure water to obtain the ferromagnetic powder.

In a case where the composition of the obtained ferromagnetic powder is confirmed by a high frequency inductively coupled plasma-optical emission spectrometry (ICP-OES), it is Ga, Co, and Ti-substituted ε-iron oxide (ε-Ga0.28$Co_{0.05}Ti_{0.05}Fe_{1.62}O_3$). In addition, X-ray diffraction analysis is performed under the same conditions as those described in regards to the hexagonal strontium ferrite powder SrFe1, and it is confirmed from the peaks of the X-ray diffraction pattern that the obtained ferromagnetic powder has a crystal structure of a single phase of the ε phase (crystal structure of the ε-iron oxide type), which does not include the crystal structures of the α phase and γ phase.

The ε-iron oxide powder thus obtained has an average particle size of 12 nm, an activation volume of 746 $nm^3$, an anisotropy constant Ku of $1.2 \times 10^5$ $J/m^3$, and a mass magnetization σs of 16 $A \cdot m^2/kg$.

The activation volume and anisotropy constant Ku of the hexagonal strontium ferrite powder and the ε-iron oxide powder are values obtained by the method described above using a vibrating sample magnetometer (manufactured by Toei Industry Co., Ltd.) for each ferromagnetic powder.

In addition, the mass magnetization σs is a value measured with a magnetic field intensity of 1194 kA/m (15 kOe) using the vibrating sample magnetometer (manufactured by Toei Industry Co., Ltd.).

Evaluation of Magnetic Tape (1) TDSage

The magnetic tape cartridge accommodating the magnetic tape to be measured is placed in an environment having an ambient temperature of 23° C. and a relative humidity of 50% for 5 days in order to adapt to the measurement environment.

Thereafter, in the measurement environment, the magnetic tape is made to run in a state of applying a tension of 0.7 N in the longitudinal direction of the magnetic tape in the magnetic tape apparatus shown in FIG. 3. For such running, over the entire length of the magnetic tape, the interval between two servo bands adjacent to each other across the data band is measured at 1 m interval. Measurements are made for all servo band intervals. The servo band interval measured in this way is defined as the "servo band interval before storage" at each measurement position. The interval between two servo bands adjacent to each other across the data band is obtained as follows.

The dimension of the servo pattern is necessary to obtain the interval between two servo bands adjacent to each other across the data band. The dimension standards of the servo pattern depend on the generation of LTO. Therefore, first, an average distance AC between four stripes corresponding to an A burst and a C burst and an azimuth angle α of the servo pattern are measured by using a magnetic force microscope or the like.

Next, the servo patterns formed on the magnetic tape are sequentially read along the tape longitudinal direction by using a reel tester and a servo head comprising two servo signal reading elements (hereinafter, one side is referred to as an upper side and the other side is referred to as a lower side.) fixed at intervals in the direction orthogonal to the longitudinal direction of the magnetic tape. An average time between five stripes corresponding to the A burst and the B burst over the length of 1 LPOS word is defined as a. An average time between four stripes corresponding to the A burst and the C burst over the length of 1 m is defined as b. At this time, the value defined by AC×(½−a/b)/(2×tan (a)) represents a reading position PES in the width direction based on the servo signal obtained by the servo signal reading element. The servo pattern reading is performed simultaneously by the two servo signal reading elements on the upper side and the lower side. The PES value obtained by the upper servo signal reading element is defined as PES1 and the PES value obtained by the lower servo signal reading element is defined as PES2. As "PES2−PES1", the interval between two servo bands adjacent to each other across the data band can be obtained. This is because the upper and lower servo pattern reading elements are fixed to the servo head and their intervals do not change.

Then, the magnetic tape cartridge is stored for 24 hours in an environment having an ambient temperature of 60° C. and a relative humidity of 20%.

After such storage, the magnetic tape cartridge is placed in a measurement environment having an ambient temperature of 23° C. and a relative humidity of 50% for 5 days. Thereafter, in the magnetic tape apparatus shown in FIG. 3 under the same measurement environment, the magnetic tape is made to run in a state of applying a tension of 0.7 N in the longitudinal direction of the magnetic tape. For such running, the servo band interval is measured in the same manner as in the method described above. The servo band interval measured in this way is defined as the "servo band interval after storage" at each measurement position.

For all servo band intervals, a difference between the servo band interval before storage and the servo band interval after storage measured at 1 m interval is obtained. In this way, a plurality of difference values are obtained. The maximum absolute value of the obtained difference is defined as the "TDSage" of the magnetic tape to be measured.

(2) TDSenv

Measurements are made in five environments (a temperature of 16° C. and relative humidity of 20%, a temperature of 16° C. and relative humidity of 80%, a temperature of 26° C. and relative humidity of 80%, a temperature of 32° C. and relative humidity of 20%, and a temperature of 32° C. and relative humidity of 55) by the following methods.

For each measurement environment, the magnetic tape cartridge accommodating the magnetic tape to be measured is placed in the measurement environment for 5 days in order to adapt to the measurement environment.

Thereafter, in the measurement environment, the magnetic tape is made to run in a state of applying a tension of 0.7 N in the longitudinal direction of the magnetic tape in the magnetic tape apparatus shown in FIG. 3. The servo band interval is measured in the data band 0 (zero) by the method described in (1) for the above running at 1 m intervals in the reel periphery 100 m region. As described above, the arithmetic average of the measured servo band intervals is taken as the servo band interval in the measurement environment.

After obtaining the servo band interval in each of the five environments as described above, a value calculated as "(maximum−minimum)×½" is defined as "TDSenv" of the magnetic tape to be measured by using the maximum value and the minimum value among the obtained values.

(3) TC

Measurements are made in five environments (a temperature of 16° C. and relative humidity of 20%, a temperature of 16° C. and relative humidity of 80%, a temperature of 26° C. and relative humidity of 80%, a temperature of 32° C. and relative humidity of 20%, and a temperature of 32° C. and relative humidity of 55) by the following methods.

For each measurement environment, the magnetic tape cartridge accommodating the magnetic tape to be measured is placed in the measurement environment for 5 days in order to adapt to the measurement environment.

Then, under the measurement environment, the following measurements are performed in the magnetic tape apparatus shown in FIG. 3.

The magnetic tape is made to run in a state of applying a tension of 0.2 N in the longitudinal direction of the magnetic tape. During the running, the servo band interval is measured at 1 m intervals in the data band 0 (zero) in the reel periphery 100 m region.

The arithmetic average of the measured servo band intervals is defined as "$G_{0.2\,N}$".

After measuring $G_{0.2\,N}$, the tension applied in the longitudinal direction of the magnetic tape is increased to 0.4 N, the servo band interval is measured in the same manner as described above in a state of applying a tension of 0.4 N, and the arithmetic average of the measured servo band intervals is defined as "$G_{0.4\,N}$".

After measuring $G_{0.4\,N}$, the tension applied in the longitudinal direction of the magnetic tape is increased to 0.6 N, the servo band interval is measured in the same manner as described above in a state of applying a tension of 0.6 N, and the arithmetic average of the measured servo band intervals is defined as "$G_{0.6\,N}$".

After measuring $G_{0.6\,N}$, the tension applied in the longitudinal direction of the magnetic tape is increased to 0.8 N, the servo band interval is measured in the same manner as described above in a state of applying a tension of 0.8 N, and the measured servo band intervals is defined as "$G_{0.8\,N}$".

After measuring $G_{0.8\,N}$, the tension applied in the longitudinal direction of the magnetic tape is increased to 1.0 N, the servo band interval is measured in the same manner as described above in a state of applying a tension of 1.0 N, and the arithmetic average of the measured servo band intervals is defined as "$G_{1.0\,N}$".

After measuring $G_{1.0\,N}$, the tension applied in the longitudinal direction of the magnetic tape is increased to 1.2 N, the servo band interval is measured in the same manner as described above in a state of applying a tension of 1.2 N, and the arithmetic average of the measured servo band intervals is defined as "$G_{1.2\,N}$".

With respect to $G_{0.2\,N}$, $G_{0.4\,N}$, $G_{0.6\,N}$, $G_{0.8\,N}$, $G_{1.0\,N}$, and $G_{1.2}$ N obtained by the above method, the absolute value of a slope A obtained by the least-squares method using the servo band intervals (that is, the above arithmetic average obtained by each measurement) obtained in a state where the tension is applied as X of the linear function Y=AX+B (A is a slope, B is an intercept) and Y is defined as the "TDStens" which is the ratio of the change in the servo band interval to the change in tension in the measurement environment.

The above measurement is performed in the above five environments. A minimum value of TDStens obtained in each of the five environments is adopted as a value of "TDStens" for obtaining the TC of the magnetic tape to be measured, and a value obtained by multiplying the value of TDStens (unit: μm/N) by 0.5 N, that is, a value calculated as "TDStens×0.5" is defined as the "TC" of the magnetic tape to be measured.

From the various values obtained as described above, the left side of Expression 1 (that is, "TDSage+TDSenv−TC") is calculated. The calculated values are shown in Table 1.

(4) Tape Thickness

The magnetic tape cartridge after the above evaluation is placed in an environment having a temperature of 20° C. to 25° C. and a relative humidity of 40% to 60% for 5 days or more to allow the magnetic tape cartridge to adapt to the environment. Then, subsequently, in the same environment, 10 tape samples (length 5 cm) are cut out from a random part of the magnetic tape taken out from the magnetic tape cartridge, and these tape samples are stacked to measure the thickness. The thickness is measured using a Millimar 1240 compact amplifier manufactured by MARH and a digital thickness meter of the Millimar 1301 lead probe. A value (thickness per one tape sample) obtained by dividing the measured thickness by 1/10 is defined as the tape thickness. With respect to each magnetic tape, the tape thickness is the thickness shown in Table 1.

Evaluation of Recording and Reproducing Performance

The recording and reproducing performance is evaluated using the magnetic tape apparatus having the configuration shown in FIG. 3. The recording and reproducing head mounted on the recording and reproducing head unit has a reproducing element (reproducing element width: 0.8 μm) and a recording element of equal to or more than 32 channels, and has servo signal reading elements on both sides thereof.

The magnetic tape cartridges of the examples and comparative Examples are placed in an environment in which the servo band interval obtained in the measurement for obtaining TDSenv is the maximum value in the above-described five environments for 5 days or more. After adapting to the environment in this way, the data is continuously recorded in the same environment as follows.

The magnetic tape cartridge is set in the magnetic tape apparatus and the magnetic tape is loaded. Next, while performing servo tracking, the recording and reproducing head unit records pseudo random data having a specific data pattern on the magnetic tape. At that time, the tension applied in the longitudinal direction of the tape is 0.7 N. In the data recording, three or more round trips are recorded such that a difference between the values of (PES1+PES2)/2 between adjacent tracks is 1.16 μm. Simultaneously with the recording of the data, the value of the servo band interval of the tape entire length is measured every 1 m of the longitudinal position and recorded in the cartridge memory.

The magnetic tape cartridge having the data recorded as described above is placed in a storage environment having an ambient temperature of 60° C. and a relative humidity of 20% for 24 hours.

Then, the magnetic tape cartridges of the examples and comparative Examples are placed in an environment in which the servo band interval obtained in the measurement for obtaining TDSenv is the minimum value in the above-described five environments for 5 days or more. After adapting to the environment in this way, the data is continuously reproduced in the same environment as follows.

The magnetic tape cartridge is set in the magnetic tape apparatus and the magnetic tape is loaded. Then, the data recorded on the magnetic tape are reproduced by the recording and reproducing head unit while performing servo tracking. At that time, the value of the servo band interval is measured simultaneously with reproduction, and the tension applied in the tape longitudinal direction is adjusted such that the absolute value of the difference from the servo band interval at the time of recording at the same longitudinal position approaches 0 on the basis of information recorded in the cartridge memory. During reproducing, measurement of the servo band interval and tension adjustment based on it are continuously performed in real time. The maximum tension and the minimum tension among the values of the tension used by the control apparatus 11 to adjust the tension during reproduction using the magnetic tape cartridges of the examples and comparative examples are as shown in Table 1.

The number of channels in the above reproduction is 32, and the recording and reproducing performance is evaluated as "3" in a case where all the data of 32 channels are correctly read during reproduction, the recording and reproducing performance is evaluated as "2" in a case where the data of 31 to 28 channels are correctly read, and the recording and reproducing performance is evaluated as "1" in other cases.

Evaluation of Running Stability

The running stability is evaluated using the magnetic tape apparatus having the configuration shown in FIG. 3. The recording and reproducing head mounted on the recording and reproducing head unit has a reproducing element (reproducing element width: 0.8 μm) and a recording element of equal to or more than 32 channels, and has servo signal reading elements on both sides thereof.

The magnetic tape cartridges of the examples and comparative examples are placed in a measurement environment having an ambient temperature of 23° C. and a relative humidity of 50% for 5 days or more. After adapting to the measurement environment in this way, the running stability is evaluated in the same environment as follows.

The magnetic tape cartridge is set in the magnetic tape apparatus and the magnetic tape is loaded. Next, while performing servo tracking, the entire length of the magnetic tape is repeatedly run. The tape running speed at that time is set within the range of 4 to 7 m/s. The tension applied in the longitudinal direction of the magnetic tape is variable within a range from the minimum tension to the maximum tension described in Table 1. During running, "PES1" and "PES2" described above are continuously measured for each servo frame, and in a case where these values exceed ±0.3 μm with respect to the servo tracking position, it is determined that off-track has occurred. Running is continued for 24 hours, and in a case where the off-track generation is measured at least once in each running path (full-length one-way) in a servo frame of 1% or more of the entire length of the magnetic tape, the running stability is evaluated as "B", and in a case where the off-track generation is not measured, the running stability is evaluated as "A".

The results described above are shown in Table 1.

TABLE 1

| Item Unit | Ferromagnetic powder | Heat treatment temperature ° C. | TDsage μm | Support type | Support thickness μm | Support moisture content % | (A) Young's modulus of support in width direction MPa | (B) Young's modulus of support in longitudinal direction MPa | (B)-(A) MPa |
|---|---|---|---|---|---|---|---|---|---|
| Example 1 | BaFe | 60 | 0.70 | PEN | 4.0 | 1.0% | 5000 | 6000 | 1000 |
| Example 2 | BaFe | — | 1.00 | PEN | 4.0 | 0.1% | 5000 | 6000 | 1000 |
| Example 3 | BaFe | — | 1.00 | PEN | 3.6 | 1.0% | 5000 | 6000 | 1000 |

TABLE 1-continued

| | | | | | | | | | |
|---|---|---|---|---|---|---|---|---|---|
| Example 4 | BaFe | 70 | 0.60 | PEN | 4.0 | 1.0% | 5000 | 6000 | 1000 |
| Example 5 | BaFe | 60 | 0.60 | PET | 4.0 | 0.8% | 6000 | 8000 | 2000 |
| Example 6 | BaFe | — | 0.90 | PET | 4.0 | 0.1% | 6000 | 8000 | 2000 |
| Example 7 | BaFe | — | 0.90 | PET | 3.6 | 0.8% | 6000 | 8000 | 2000 |
| Example 8 | BaFe | 70 | 0.50 | PET | 4.0 | 0.8% | 6000 | 8000 | 2000 |
| Comparative Example 1 | BaFe | — | 1.00 | PEN | 4.0 | 1.0% | 5000 | 6000 | 1000 |
| Example 9 | BaFe | — | 1.00 | PEN | 4.0 | 1.0% | 5000 | 6000 | 1000 |
| Comparative Example 2 | BaFe | — | 0.90 | PET | 4.0 | 0.8% | 6000 | 8000 | 2000 |
| Example 10 | BaFe | — | 0.90 | PET | 4.0 | 0.8% | 6000 | 8000 | 2000 |
| Example 11 | SrFe1 | 60 | 0.70 | PEN | 4.0 | 1.0% | 5000 | 6000 | 1000 |
| Example 12 | SrFe2 | 60 | 0.70 | PEN | 4.0 | 1.0% | 5000 | 6000 | 1000 |
| Example 13 | | 60 | 0.70 | PEN | 4.0 | 1.0% | 5000 | 6000 | 1000 |

| Item | TDsenv | Tape thickness | TC | TDstens | Maximum tension | Minimum tension | Running stability | TDsage + TDsenv − TC | Recording and reproducing performance |
|---|---|---|---|---|---|---|---|---|---|
| Unit | μm | μm | μm | μm/N | N | N | | μm | |
| Example 1 | 0.50 | 5.6 | 1.00 | 2.00 | 1.20 | 0.20 | A | 0.20 | 2 |
| Example 2 | 0.30 | 5.6 | 1.00 | 2.00 | 1.20 | 0.20 | A | 0.30 | 2 |
| Example 3 | 0.50 | 5.2 | 1.20 | 2.40 | 1.20 | 0.20 | A | 0.30 | 2 |
| Example 4 | 0.50 | 5.6 | 1.00 | 2.00 | 1.20 | 0.20 | A | 0.10 | 2 |
| Example 5 | 0.40 | 5.6 | 0.90 | 1.80 | 1.20 | 0.20 | A | 0.10 | 2 |
| Example 6 | 0.20 | 5.6 | 0.90 | 1.80 | 1.20 | 0.20 | A | 0.20 | 2 |
| Example 7 | 0.40 | 5.2 | 1.00 | 2.00 | 1.20 | 0.20 | A | 0.30 | 2 |
| Example 8 | 0.40 | 5.6 | 0.90 | 1.80 | 1.20 | 0.20 | A | 0.00 | 3 |
| Comparative Example 1 | 0.50 | 5.6 | 1.00 | 2.00 | 1.20 | 0.20 | A | 0.50 | 1 |
| Example 9 | 0.50 | 5.6 | 1.20 | 2.00 | 1.30 | 0.10 | B | 0.30 | 2 |
| Comparative Example 2 | 0.40 | 5.6 | 0.90 | 1.80 | 1.20 | 0.20 | A | 0.40 | 1 |
| Example 10 | 0.40 | 5.6 | 1.08 | 1.80 | 1.30 | 0.10 | B | 0.22 | 2 |
| Example 11 | 0.50 | 5.6 | 1.00 | 2.00 | 1.20 | 0.20 | A | 0.20 | 2 |
| Example 12 | 0.50 | 5.6 | 1.00 | 2.00 | 1.20 | 0.20 | A | 0.20 | 2 |
| Example 13 | 0.50 | 5.6 | 1.00 | 2.00 | 1.20 | 0.20 | A | 0.20 | 2 |

From the results shown in Table 1, it can be confirmed that the magnetic tape of the Examples is a magnetic tape suitable for use in a magnetic tape apparatus for controlling the dimension in the width direction of the magnetic tape by adjusting the tension applied to the longitudinal direction of the magnetic tape.

In addition, from the results shown in Table 1, it can also be confirmed that the tension adjustment range is preferably in the range of 0.2 N to 1.2 N from the viewpoint of running stability.

One aspect of the present invention is useful in various data storage technical fields.

What is claimed is:

1. A magnetic tape comprising:
a non-magnetic support; and
a magnetic layer containing a ferromagnetic powder, wherein the magnetic layer has a plurality of servo bands, the following Expression 1 is satisfied;

$$TDSage + TDSenv - TC \leq 0.30 \text{ μm}, \quad \text{(Expression 1)}$$

in Expression 1, TDSage is a maximum absolute value of a difference between a servo band interval obtained before storage for 24 hours in an environment with a temperature of 60° C. and a relative humidity of 20% and a servo band interval obtained after the storage, where a unit of TDSage is μm,
TDSenv is a value calculated by multiplying a difference between a maximum value and a minimum value by ½ in servo band intervals obtained respectively in the following five environments;
a temperature of 16° C. and a relative humidity of 20%,
a temperature of 16° C. and a relative humidity of 80%,
a temperature of 26° C. and a relative humidity of 80%,
a temperature of 32° C. and a relative humidity of 20%, and
a temperature of 32° C. and a relative humidity of 55%,
where a unit of TDSenv is μm,
TC is a value calculated by multiplying TDStens by 0.5 N, and
TDStens is a ratio of a change in a servo band interval to a change in tension, which is calculated from servo band intervals obtained by applying a plurality of different tensions in a longitudinal direction of the magnetic tape and obtained respectively in the following five environments;
a temperature 16° C. and a relative humidity 20%,
a temperature 16° C. and a relative humidity 80%,
a temperature 26° C. and a relative humidity 80%,
a temperature 32° C. and a relative humidity 20%, and
a temperature 32° C. and a relative humidity 55%
where a unit of TDStens is μm/N.

2. The magnetic tape according to claim 1, wherein the following Expression 1-1 is satisfied;

$$TDSage + TDSenv - TC \leq 0.05 \text{ μm}. \quad \text{(Expression 1-1)}$$

3. The magnetic tape according to claim 1, wherein a tape thickness is equal to or less than 5.6 μm.

4. The magnetic tape according to claim 1, wherein a tape thickness is equal to or less than 5.3 μm.

5. The magnetic tape according to claim 1, wherein a non-magnetic layer containing a non-magnetic powder is provided between the non-magnetic support and the magnetic layer.

6. The magnetic tape according to claim 1, wherein a back coating layer containing a non-magnetic powder is provided on a surface side of the non-magnetic support opposite to a surface side having the magnetic layer.

7. The magnetic tape according to claim 1,
wherein the non-magnetic support is an aromatic polyester support.

8. The magnetic tape according to claim 7,
wherein the aromatic polyester support is a polyethylene terephthalate support.

9. The magnetic tape according to claim 7,
wherein the aromatic polyester support is a polyethylene naphthalate support.

10. A magnetic tape cartridge comprising the magnetic tape according to claim 1.

11. The magnetic tape cartridge according to claim 10,
wherein the magnetic tape satisfies the following Expression 1-1;

$$TDSage + TDSenv - TC \leq 0.05 \; \mu m. \quad \text{(Expression 1-1)}$$

12. The magnetic tape cartridge according to claim 10,
wherein a tape thickness of the magnetic tape is equal to or less than 5.6 μm.

13. The magnetic tape cartridge according to claim 10,
wherein a tape thickness of the magnetic tape is equal to or less than 5.3 μm.

14. The magnetic tape cartridge according to claim 10,
wherein the non-magnetic support of the magnetic tape is an aromatic polyester support.

15. The magnetic tape cartridge according to claim 14,
wherein the aromatic polyester support is a polyethylene terephthalate support.

16. The magnetic tape cartridge according to claim 14,
wherein the aromatic polyester support is a polyethylene naphthalate support.

17. A magnetic tape apparatus comprising the magnetic tape cartridge according to claim 10.

18. The magnetic tape apparatus according to claim 17,
wherein in a case where the magnetic tape runs in the magnetic tape apparatus, a tension applied in the longitudinal direction of the magnetic tape is variably adjusted.

19. The magnetic tape apparatus according to claim 18,
wherein the tension is adjusted in a range of 0.2 N to 1.2 N.

20. The magnetic tape apparatus according to claim 17, further comprising:
a magnetic head having a reproducing element having a reproducing element width of equal to or less than 0.8 μm.

* * * * *